US011195366B2

(12) United States Patent
Danielson et al.

(10) Patent No.: US 11,195,366 B2
(45) Date of Patent: Dec. 7, 2021

(54) ILLUMINATED AND ANIMATED CASINO TOKENS

(71) Applicant: IGT, Las Vegas, NV (US)

(72) Inventors: Patrick Danielson, Las Vegas, NV (US); Dwayne Nelson, Las Vegas, NV (US); Samantha Ascheri-Phillips, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 16/562,242

(22) Filed: Sep. 5, 2019

(65) Prior Publication Data

US 2021/0074117 A1 Mar. 11, 2021

(51) Int. Cl.
*G07F 17/32* (2006.01)
*G06K 19/04* (2006.01)

(52) U.S. Cl.
CPC ........ *G07F 17/3211* (2013.01); *G06K 19/047* (2013.01); *G07F 17/3216* (2013.01); *G07F 17/3223* (2013.01)

(58) Field of Classification Search
CPC ... G07F 17/322; G07F 17/3251; A44C 21/00; A63F 2003/00703; G06K 19/047
See application file for complete search history.

(56) References Cited

U.S. PATENT DOCUMENTS

| 2010/0093428 A1* | 4/2010 | Mattice | G07F 17/3251 463/25 |
| 2013/0190076 A1* | 7/2013 | Sammon | G07F 17/32 463/25 |
| 2020/0005281 A1* | 1/2020 | Patel | G06Q 20/123 |

* cited by examiner

*Primary Examiner* — Jay Trent Liddle
(74) *Attorney, Agent, or Firm* — Sheridan Ross P.C.

(57) ABSTRACT

The present disclosure relates generally to a gaming token representing a wager amount placed in a game that can provide different sensory feedback responses in response to different sensed contexts associated with the token. Illustratively, a method of facilitating player interaction in a game includes receiving, by a gaming system, a gaming token representing a wager amount placed in a game; receiving, by a processor of the gaming system from a context sensor, input that a context is associated with the gaming token; determining by the processor, from among a plurality of different possible sensory feedback responses, a selected sensory feedback response corresponding to a determined context; and causing, by the processor, the gaming token to produce the processor selected sensory feedback response.

20 Claims, 11 Drawing Sheets

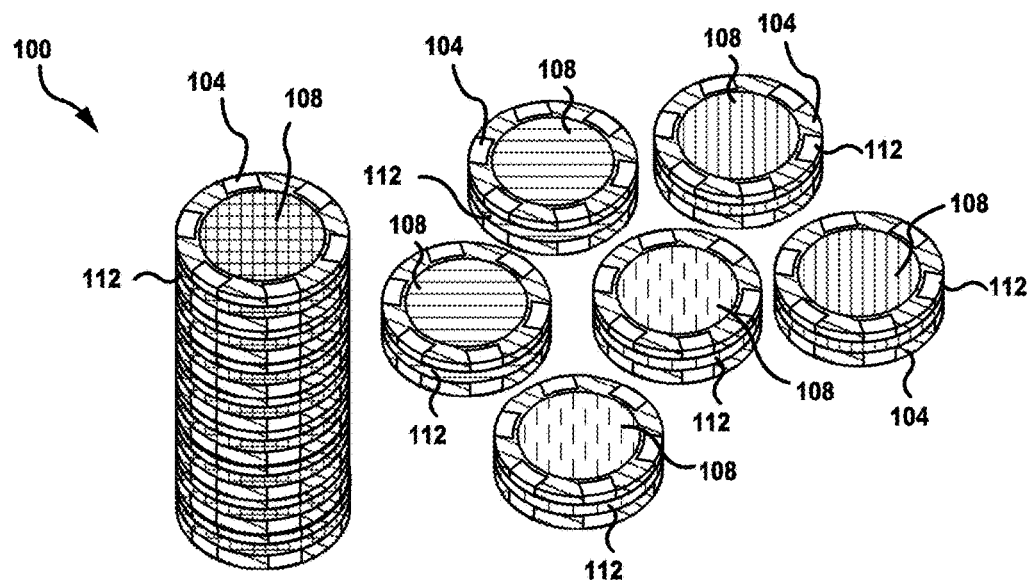
FIG. 1A
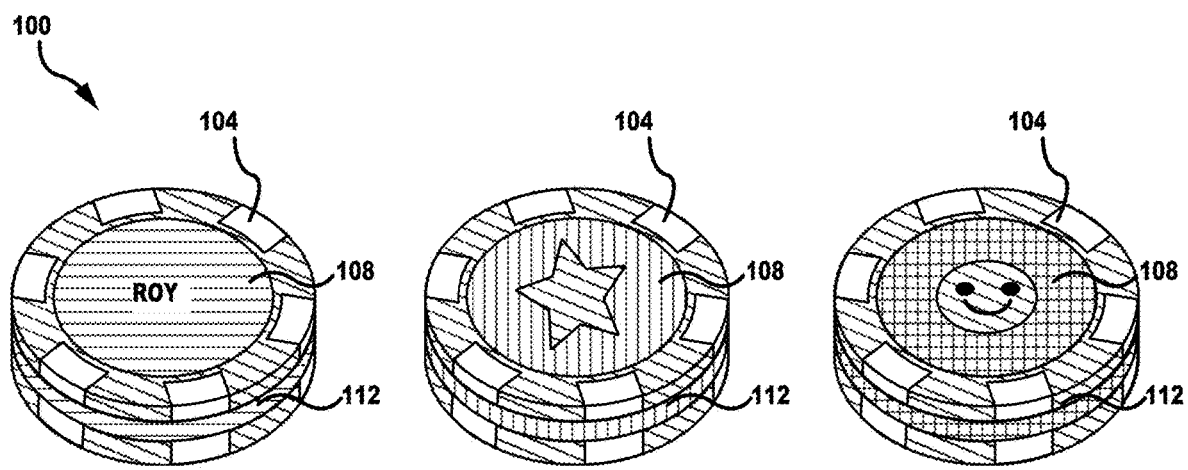
FIG. 1B  FIG. 1C  FIG. 1D

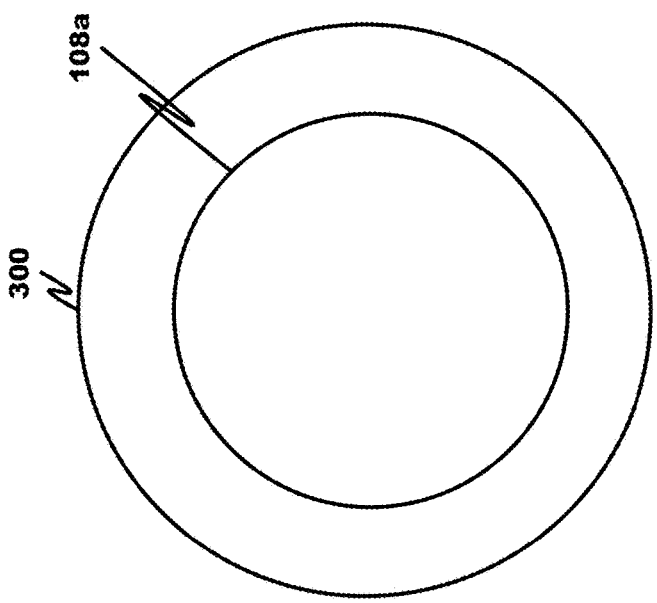
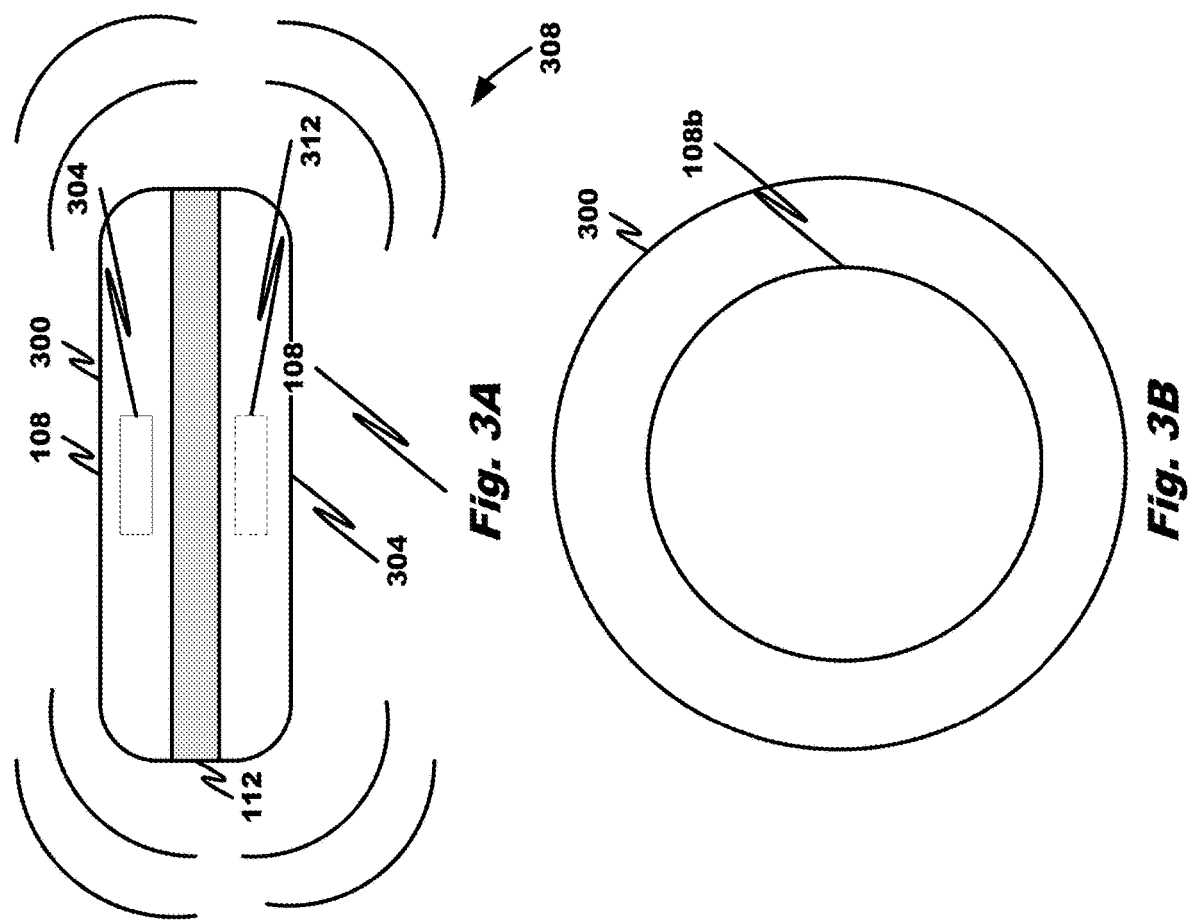
Fig. 3A
Fig. 3B
Fig. 3C

ILLUMINATED AND ANIMATED CASINO TOKENS

BACKGROUND

The present disclosure is directed toward gaming tokens, such as casino or gaming venue chips or tokens.

Casino tokens (also known as casino or gaming chips, checks, or cheques) are small discs used in lieu of currency in casinos. Colored metal, injection-molded plastic or compression molded clay tokens of various denominations are used primarily in table games, as opposed to metal token coins, used primarily in slot machines. Casino tokens are also widely used as play money in casual or tournament games.

Tokens are employed for several reasons. Because of the uniform size, shape, and patterns of stacks of chips, they can be easier to tally compared to currency. The uniform weight of the casino's official tokens allows them to weigh great stacks or heaps of chips rather than tally them (though aids such as chip trays are far more common.) Consumers gamble more freely with replacement currencies than with cash. Finally, using chips in place of cash at table games can discourage players from grabbing back their bet and attempting to flee should their bet not win.

BRIEF SUMMARY

In certain embodiments, the present disclosure relates to a gaming system, comprising: a gaming token representing a wager amount placed in a game, the gaming token comprising a sensory feedback source to produce a selected sensory feedback response; a context sensor to sense a context associated with the gaming token; and a processor causing the gaming token to have a first state in response to a first sensed context and a second state in response to a second sensed context. The sensory feedback source provides, in the first state, a first sensory feedback response and, in the second state, a different second sensory feedback response.

In some embodiments, the present disclosure also relates to a method of facilitating player interaction in a game, comprising: receiving, by a gaming system, a gaming token representing a wager amount placed in a game; receiving, by a processor of the gaming system from a context sensor, input that a context is associated with the gaming token; determining by the processor, from among a plurality of different possible sensory feedback responses, a selected sensory feedback response corresponding to the context; and causing, by the processor, the gaming token to produce the processor selected sensory feedback response.

In some embodiments, the present disclosure also relates to a gaming token used to represent a wager amount in a game, comprising: a processor; a context sensor coupled with the processor; a sensory feedback source to produce a selected sensory feedback response, the sensory feedback source being coupled with the processor; and a computer-readable storage medium, coupled with the processor, comprising instructions that are executable by the processor. The instructions comprise: a set of instructions that sense a context associated with the gaming token; a set of instructions that determine, based on the sensed context from among a plurality of different possible sensory feedback responses, the selected sensory feedback response corresponding to the sensed context; and a set of instructions that cause the sensory feedback source to provide the selected sensory feedback response.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

Additional features and advantages are described herein and will be apparent from the following Description and the figures.

BRIEF DESCRIPTION OF THE SEVERAL VIEWS OF THE DRAWINGS

FIG. 1A illustrates an assortment of gaming venue tokens in accordance with embodiments of the present disclosure;

FIG. 1B illustrates a gaming venue token in accordance with embodiments of the present disclosure;

FIG. 1C illustrates a gaming venue token in accordance with embodiments of the present disclosure;

FIG. 1D illustrates a gaming venue token in accordance with embodiments of the present disclosure;

FIG. 3A illustrates a side view of a gaming venue token in accordance with embodiments of the present disclosure;

FIG. 3B illustrates, in plan view, a top of a gaming venue token in accordance with embodiments of the present disclosure;

FIG. 3C illustrates, in plan view, a bottom of a gaming venue token in accordance with embodiments of the present disclosure;

DETAILED DESCRIPTION

Figure 2:
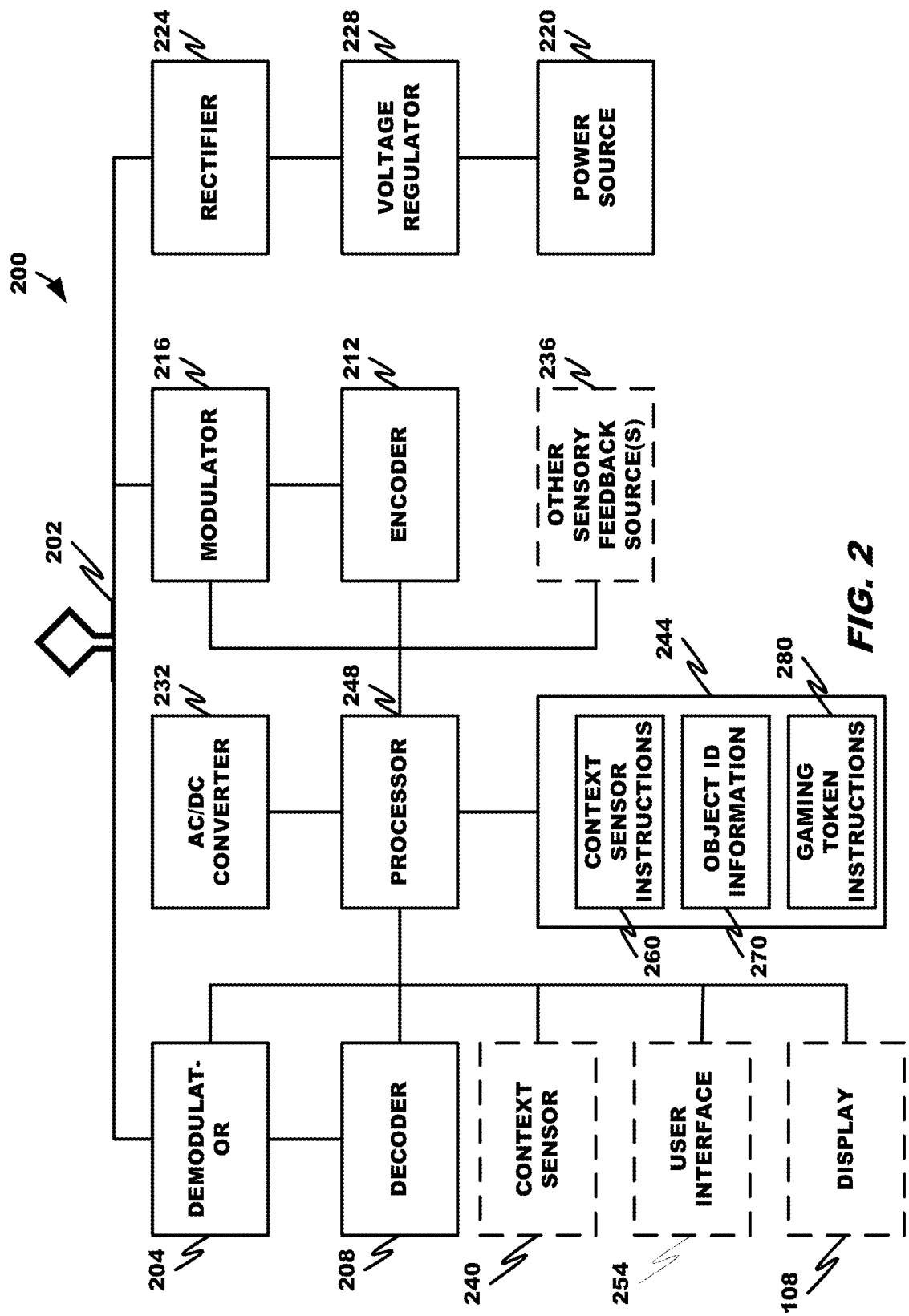
FIG. 2 illustrates a gaming venue token in accordance with embodiments of the present disclosure.

The gaming venue token of the present disclosure can be in the form of physical token, such as casino token or chip, token coin, or a virtual (or digital representation of a) token, such as a cylindrical or disc-shaped object rendered on a display of a display device. The virtual token can be a digital representation of value that can be digitally redeemed as a store of value. The gaming venue token typically represents a wager amount placed in a game (including but not limited to a game of chance, a game of skill, and/or a game of partial skill). The gaming venue token can provide a dynamic user sensory feedback response, such as color, video, sound, and/or movement, in response to and dependent upon a sensed context associated with the token. Stated differently, the gaming venue token can produce, in response to first sensed context information, a first sensory feedback response corresponding to a first appearance of the token and, in response to different second sensed context information, a second sensory feedback response corresponding to a different second appearance of the token.

The tokens can not only have a substantially uniform size, shape, and pattern, be stackable to form stacks of chips to provide ease of tallying compared to currency, and have a substantially uniform weight to allow them to be weighed and tallied even when in large stacks or heaps but also through customized or dynamic user sensory feedback responses to players provide higher levels of customer satisfaction leading to higher casino revenue. The use of sensed context information to control the behavior of the gaming token can give a player the perception that the gaming token is more than simply a form of currency or a store of value but rather is an artificially intelligent gaming companion that is uniquely linked to the player. The incorporation of one or more displays into the token enables the same token to display content customized for different players or games or reflecting different token values, thereby enhancing player satisfaction and reducing casino chip demands. Additionally, the gaming venue token can be used as an alternate player tracking mechanism due to its on board logic and wireless communication ability. The gaming venue token can have an on board power source that is wirelessly chargeable to provide ease of use to the player and casino. In some embodiments, these benefits can be realized inexpensively by attaching a tag, such as RFID tag, and one or more interconnected sensory feedback sources, such as LED lights, to a casino token or token coin. It should be appreciated that the user value associated with the gaming venue token 104 may include a non-monetary award and/or a monetary award.

Referring to FIG. 1A, an assortment 100 of physical or digitally represented gaming venue tokens 104 are illustrated in accordance with an embodiment. Each of the tokens 104 comprises a visual display 108 and an illuminated circumferential band 112.

The displays 108 of the various gaming venue tokens 104 can display the same or a different content, and/or the illuminated circumferential band 112 can emit the same or a different wavelength spectrum and/or intensity of light. The displayed content can be a color or set of colors (e.g., blue, yellow, pink, red, purple, etc.), video (such as an advertisement or promotions of the casino, a video of the player or of a gaming event, an animation, a set of symbols, and the like), digitally represented image (such as an assigned cash or point value, picture of the player, logo of the casino, gaming event information (such as a game outcome, wager, and the like)), symbol, and the like. The displays can be any type of digital display, including a cathode ray tube, liquid crystal display, light-emitting diode (e.g., organic light-emitting diode or active-matrix organic light-emitting diode) display, electronic paper or electronic ink ("E Ink"), electroluminescent display, plasma display, and quantum dot display. It can be a segmented or unsegmented.

The illuminated circumferential band 112 can emit the same or different colors or sets of colors as the display 108 of the corresponding chip. The sets of color emitted by the band 112 can be substantially constant or vary in intensity (e.g., the light can pulsate in intensity) and/or have a substantially constant wavelength spectrum or a variable or temporally differing wavelength spectra. The illuminated circumferential band 112 can comprise one or more lighting sources, such as a light-emitting diode, incandescent bulb, luminescent bulb, and the like. Mirrors or other reflective surfaces may be employed to direct the emitted light radially outwardly and/or circumferentially. While the illuminated band is shown as extending around the circumference of the token, it is to be understood that the light can be emitted from only one or multiple discrete locations on any part or parts of the token exterior.

Referring to FIGS. 1B, 1C, and 1D, the displays 108 of the tokens 104 display different content. For example, the token 104 of FIG. 1B displays the corresponding player's name "Roy" against a background having a first color (blue), the token 104 of FIG. 1C displays a star selected by a gaming device against a background having a second color (red), and the token 104 of FIG. 1D displays a smiley face selected by the corresponding player against a background having a third color (yellow). The illuminated band 112 of each of the chips 104 can emit the same or different colors as the background color of its corresponding displayed content.

Referring to FIGS. 3A-C, a gaming venue token 300 in accordance with another embodiment is shown. The gaming venue token 300 comprises the illuminated circumferential band 112 and upper and lower displays 108*a,b* and other sensory feedback sources, namely a speaker 304 and a vibrating device 312 causing the token to vibrate.

The speaker 304 can emit as sensory feedback response an audible sound having any selected sound spectrum and volume. The sound can be, for example, a sequence of sounds or constant sound. The sound can be synthetic or natural speech, music, recorded or streamed environmental, direct or other ambient sounds, and the like.

The speaker 304 of spatially proximate gaming venue tokens can emit simultaneously the same or different sounds. For example, a first speaker of a first gaming venue token can emit a first audible sound having a first sound spectrum, and a second speaker of a second gaming venue token can emit a second audible sound having a second sound spectrum, wherein the first and second sound spectra are different from each other.

The vibrating device 312 causes the gaming venue token to vibrate or oscillate as shown by vibrations 308. The vibrating device 312 can be any oscillating device, such as an electromechanical vibration motor (e.g., eccentric rotating mass vibration motor (ERM) or linear resonant actuator (LRA)) or an electromagnetic device (such as transducer), and the like.

Referring to FIG. 2, the functional components of a typical gaming venue token 200 are illustrated in accordance with an embodiment. The gaming venue token 200 comprises an antenna 202 (such as an RF antenna, WiFi antenna and driver circuit, Bluetooth antenna and driver circuit, or a cellular communication antenna and driver circuit) to send and receive encoded wireless signals, a demodulator 204 to demodulate received wireless signals and decoder 208 to decode the demodulated signal and perform the necessary transformations to determine the data in the signal, an encoder 212 to transform and encode data to be emitted by the antenna 202 and a modulator 216 to modulate encoded data for transmission, a power source 220, a rectifier 224 to convert received electromagnetic (charging) signals into electrical energy, such as Alternating Current ("AC") or Direct Current ("DC") power, a voltage regulator 228 that, due to the large variation in rectified voltage, automatically maintains a constant voltage level, an AC-DC converter 232 to convert an AC electrical energy input to a DC electrical energy output (or vice versa), the (optional) display 108, other (optional) sensory feedback source(s) 236, an (optional) user interface 254, an (optional) context sensor 240, and a memory 244, all coupled to a (micro)processor 248. As will be appreciated, the electromagnetic (charging) signals can be any frequency, such as radio frequency, and includes inductive charging, which is a type of wireless or cordless charging that uses an electromagnetic field to transfer energy between two objects using electromagnetic induction. The power supply 416 may correspond to an internal power supply that provides AC and/or DC power to components of the mobile device 128. In some embodiments, the power source 220 may correspond to one or multiple batteries or capacitors or other electromagnetic energy storage devices. Alternatively or additionally, the power source 220 may include a power adapter or wireless charger that converts AC power into DC power for direct application to components of the gaming token 104, for charging a battery, for charging a capacitor, or a combination thereof.

The optional user interface 254 may include a combination of user input devices and user output devices. For instance, the user interface 616 may be implemented as one or more buttons located on a surface of the gaming token 104, as a touch sensitive display 108, or as any other device that is capable of enabling tactile player interaction with the gaming venue token 104.

The other sensory feedback source(s) 236 can include any other device for interacting with a player, including one or more light sources (such as the illuminated circumferential band 112), speaker 304, and vibrating device 312.

The context sensor can be any device that senses or collects contextual information relating to the gaming venue token 200. In a typical gaming venue token, the context sensor 240 senses contextual information relating to the gaming venue token.

The memory 244 may include one or multiple computer memory devices that are volatile or non-volatile. The memory 244 may be configured to store instruction sets that enable interaction by another device with the gaming venue token 104 and associated data, such as a unique identifier or electronic address. The memory can include data structures, such as identification (ID) information 270. ID information 270 can be any unique or substantially unique identifier associated with a player, a gaming device, or the token 104. Examples of ID information include a communication address (such as a universally or locally administered address) associated with a mobile device of the player, a gaming device, or the token, a digital signature data structure (such as an RFID, a QR code, a barcode, or the like), an identifier associated with a player (such as a customer or customer account identifier maintained by the casino), and the like. The memory can include other data, such as game credits and customer account information. An example of an instruction set that may be stored in the memory 244 includes context sensor instructions 260 that, when executed by the processor 248, sense or collect, or enable the context sensor 240 to sense or collect, contextual information relating to the gaming venue token 200 and gaming token instructions 280 that, when executed by the processor 248, applies one or more rulesets to the sensed or collected contextual information to select one or more sensory feedback responses for the display 108 and/or other sensory feedback source(s) 236.

In an example of context, the context sensor 240 and/or context sensor instructions 260 collect, as contextual information, a current spatial position or location of the gaming venue token 104. The position can be relative to a coordinate system or selected object or location. By way of illustration, the context sensor 240 can be a satellite positioning system (such as a Global Positioning system), a magnetic positioning device, an inertial measurement device, a Wi-Fi based positioning system (which measures the intensity of received wireless signals (or received signal strength)) and fingerprinting location system (such as the use of SSID and MAC address of a nearby access point), Bluetooth location device, RFID tag, or other location device.

In a further example of context, the context sensor 240 and/or context sensor instructions 260 collect, as contextual information, displacement information associated with the gaming venue token or a surface thereof. The displacement information, for instance, can be a fact or instance of spatial displacement of the token, a rate of displacement of the token, a distance of displacement of the token, and a direction of displacement of the token. The context sensor 240 can be, for instance, a motion sensor, such as a gyro sensor, accelerometer, magnetometer, or other motion detecting devices.

The context sensor 240 and/or context sensor instructions 260 can collect, as contextual information, information regarding an ambient condition in spatial proximity to the gaming venue token. By way of illustration, the context sensor can collect information relating to ambient sound and light in spatial proximity to the gaming venue token. The context sensor 240 can be, for instance, an audio or video recorder, a microphone to detect sound, passive infrared detector, active ultrasonic wave-emitting detector, active ultrasonic detector, passive ultrasonic detector, microwave detector, or proximity detector to detect nearby persons, or a photoresistor, photovoltaic light sensor, light dependent sensor, or photo diode to detect light or light intensity, and the like.

In a further example of context, the context sensor 240 and/or context sensor instructions 260 collect, as contextual information, information regarding a current power level or state-of-charge or depth-of-charge of the power source 220. The context sensor 240 can use, for instance, a fuel gauge circuit and algorithm (such as a Columb counter), chemical method, voltage method, current integration method, combined approach, Kalman filtering, pressure method, or other device or method for determining or estimating the state-of-charge or depth-of-charge of the power source 220.

The gaming token instructions 280 receive the sensed context information from the context sensor 240, 450 (FIG. 4), or 540 (FIG. 5) or processor 248 or 604 (FIG. 6) executing the context sensor instructions 260 or 630 (FIG. 6) and, based on the sensed context information, causes a selected sensory user feedback response, such as color, video, sound, and/or movement, to be demonstrated by the physical or digital gaming token 104. For example, the illuminated circumferential band 112 and/or display 108 of the gaming token 104 can change colors or color intensity or pulsate in color based on sensed context information. The gaming token display 108 can display a symbol or video based on sensed context information. The gaming token 104 can move or vibrate or change in shape or size based on sensed context information. The gaming token 104 can play sound sequences or sets of sounds based on sensed context information. The gaming token 104 can simultaneously exhibit or generate combinations of these sensory user feedback responses or behaviors.

In other embodiments, the application of the one or more rulesets to the sensed or collected contextual information to select one or more sensory feedback responses for the display 108 and/or other sensory feedback source(s) 236 is done by another gaming system component, such as a gaming machine, mobile device, or gaming server, which then provides a sensory feedback response command to the processor 248, via the antenna 202 and demodulator 204 and decoder 208 of the token 104. The gaming token instructions 280 enable the processor 248 to process the sensory feedback response command and cause the selected sensory feedback response(s) to be implemented by the display 108 and/or other sensory feedback source(s) 236.

While the gaming venue tokens of the present disclosure have been discussed with reference to physical embodiments of tokens that may be used to place a wager in a broad variety of games, the gaming tokens may be virtual or digitally represented in a digital display of a variety of different gaming systems each having one or more of a plurality of different features, attributes, or characteristics. A "gaming system" as used herein refers to various configurations of: (a) one or more central servers, central controllers, or remote hosts; (b) one or more gaming machines such as those located on a casino floor; and/or (c) one or more personal gaming devices, such as desktop computers, laptop computers, tablet computers or computing devices, personal digital assistants, mobile phones, and other mobile computing devices.

An Electronic Gaming Machine (EGM) as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk.

An Electronic Gaming Table or Electronic Table Game (ETG) as used herein refers to a gaming machine in the form of a table that enables a player to play a game (including but not limited to a game of chance, a game of skill, and/or a game of partial skill), such as roulette, poker, blackjack or Baccarat, to potentially win one or more awards. There can be multiple player seats in the electronic gaming table for tournament or side game play, and each player can operate or play the game in the electronic gaming table.

In various embodiments, the gaming system of the present disclosure includes: (a) one or more gaming machines in combination with one or more central servers, central controllers, or remote hosts; (b) one or more personal gaming devices in combination with one or more central servers, central controllers, or remote hosts; (c) one or more personal gaming devices in combination with one or more gaming machines; (d) one or more personal gaming devices, one or more gaming machines, and one or more central servers, central controllers, or remote hosts in combination with one another; (e) a single gaming machine; (f) a plurality of gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "ETG" as used herein represents one ETG or a plurality of ETGs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts. A "gaming device" as used herein may be understood to include an EGM, multiple EGMs, an ETG, multiple ETGs, a personal gaming device, multiple personal gaming devices, a mobile device, multiple mobile devices, or combinations thereof.

As noted above, in various embodiments, the gaming system includes a gaming device in combination with a central server, central controller, or remote host. In such embodiments, the EGM or ETG (or gaming device) is configured to communicate with the central server, central controller, or remote host through a data network or remote communication link. In certain such embodiments, the EGM or ETG (or gaming device) is configured to communicate with another EGM or ETG (or gaming device) through the same data network or remote communication link or through a different data network or remote communication link. For example, the gaming system includes a plurality of gaming devices that are each configured to communicate with a central server, central controller, or remote host through a data network.

In certain embodiments in which the gaming system includes a gaming device in combination with a central server, central controller, or remote host, the central server, central controller, or remote host is any suitable computing device (such as a server) that includes at least one processor and at least one memory device or data storage device. As further described herein, the EGM or ETG (or gaming device) includes at least one EGM or ETG (or gaming device) processor configured to transmit and receive data or signals representing events, messages, commands, or any other suitable information between the EGM or ETG (or gaming device) and the central server, central controller, or remote host. The at least one processor of that EGM or ETG (or gaming device) is configured to execute the events, messages, or commands represented by such data or signals in conjunction with the operation of the EGM or ETG (or gaming device). Moreover, the at least one processor of the central server, central controller, or remote host is configured to transmit and receive data or signals representing events, messages, commands, or any other suitable information between the central server, central controller, or remote host and the EGM or ETG (or gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM or ETG (or gaming device). Further, one, more than one, or each of the functions of the at least one processor of the EGM or ETG (or gaming device) may be performed by the at least one processor of the central server, central controller, or remote host.

In certain such embodiments, computerized instructions for controlling any games (such as games causing the display of virtual gaming venue tokens 104) displayed by the EGM or ETG (or gaming device) are executed by the central server, central controller, or remote host. In such "thin client" embodiments, the central server, central controller, or remote host remotely controls any games (or other suitable interfaces) displayed by the EGM or ETG (or gaming device), and the EGM or ETG (or gaming device) is utilized to display such games (or suitable interfaces) and to receive one or more inputs or commands. In other such embodiments, computerized instructions for controlling any games displayed by the EGM or ETG (or gaming device) are communicated from the central server, central controller, or remote host to the EGM or ETG (or gaming device) and are stored in at least one memory device of the EGM or ETG (or gaming device). In such "thick client" embodiments, the at least one processor of the EGM or ETG (or gaming device) executes the computerized instructions to control any games (or other suitable interfaces) displayed by the EGM or ETG (or gaming device).

In various embodiments in which the gaming system includes a plurality of EGMs or ETGs (or gaming devices), one or more of the EGMs or ETGs (or gaming devices) are thin client EGMs or ETGs (or gaming devices) and one or more of the EGMs or ETGs (or gaming devices) are thick client EGMs or ETGs (or gaming devices). In other embodiments in which the gaming system includes one or more EGMs or ETGs (or gaming devices), certain functions of one or more of the EGMs or ETGs (or gaming devices) are implemented in a thin client environment, and certain other functions of one or more of the EGMs or ETGs (or gaming devices) are implemented in a thick client environment. In one such embodiment in which the gaming system includes an EGM or ETG (or gaming device) and a central server, central controller, or remote host, computerized instructions for controlling any games and tokens 104 displayed by the EGM or ETG (or gaming device) are communicated from the central server, central controller, or remote host to the EGM or ETG (or gaming device) in a thick client configuration, and computerized instructions for controlling any games, token 104 display, or other functions displayed by the EGM or ETG (or gaming device) are executed by the central server, central controller, or remote host in a thin client configuration.

In certain embodiments in which the gaming system includes: (a) an EGM or ETG (or gaming device) configured to communicate with a central server, central controller, or remote host through a data network; and/or (b) a plurality of EGMs or ETGs (or gaming devices) configured to communicate with one another through a communication network, the communication network may include a local area network (LAN) in which the EGMs or ETGs (or gaming devices) are located substantially proximate to one another and/or the central server, central controller, or remote host. In one example, the EGMs or ETGs (or gaming devices) and the central server, central controller, or remote host are located in a gaming establishment or a portion of a gaming establishment.

In other embodiments in which the gaming system includes: (a) an EGM or ETG (or gaming device) configured to communicate with a central server, central controller, or remote host through a data network; and/or (b) a plurality of EGMs or ETGs (or gaming devices) configured to communicate with one another through a communication network, the communication network may include a wide area network (WAN) in which one or more of the EGMs or ETGs (or gaming devices) are not necessarily located substantially proximate to another one of the EGMs or ETGs (or gaming devices) and/or the central server, central controller, or remote host. For example, one or more of the EGMs or ETGs (or gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs or ETGs (or gaming devices) are located. In certain embodiments in which the communication network includes a WAN, the gaming system includes a central server, central controller, or remote host and an EGM or ETG (or gaming device) each located in a different gaming establishment in a same geographic area, such as a same city or a same state. Gaming systems in which the communication network includes a WAN are substantially identical to gaming systems in which the communication network includes a LAN, though the quantity of EGMs or ETGs (or gaming devices) in such gaming systems may vary relative to one another.

In further embodiments in which the gaming system includes: (a) an EGM or ETG (or gaming device) configured to communicate with a central server, central controller, or remote host through a data network; and/or (b) a plurality of EGMs or ETGs (or gaming devices) configured to communicate with one another through a communication network, the communication network may include an internet (such as the Internet) or an intranet. In certain such embodiments, an Internet browser of the EGM or ETG (or gaming device) is usable to access an Internet game page from any location where an Internet connection is available. In one such embodiment, after the EGM or ETG (or gaming device) accesses the Internet game page, the central server, central controller, or remote host identifies a player before enabling that player to place any wagers (e.g., via physical or virtual gaming venue tokens 104) on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card, token 104 uniquely identifying the player, or other smart card inserted into a card reader; by validating a unique player identification number associated with the player by the central server, central controller, or remote host; or by identifying the EGM (or gaming device), such as by identifying the MAC address or the IP address of the Internet facilitator. In various embodiments, once the central server, central controller, or remote host identifies the player, the central server, central controller, or remote host enables placement of one or more wagers via tokens 104 on one or more plays of a game, and displays those tokens and plays via the Internet browser of the EGM or ETG (or gaming device).

The central server, central controller, or remote host and the EGM or ETG (or gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs or ETGs (or gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Embodiments of the present disclosure will be described in connection with a player interacting with one or more gaming devices. It should be appreciated that a gaming device, as described herein, may include a gaming machine, mobile device, server, and other computational device. While embodiments of the present disclosure will be described in connection with the example of an Electronic Gaming Table ("EGT"), Electronic Gaming Machine (EGM), Virtual Reality ("VR") gaming machine, Augmented Reality ("AR") gaming machine, or Video Gaming Machine (VGM) using improved gaming venue tokens, it should be appreciated that embodiments of the present disclosure are not so limited. For instance, other types of computational devices, such as portable user devices, smartphones, tablets, laptops, Personal Computers (PCs), wearable devices, etc. may be configured with gaming device functionality (e.g., to implement a game of chance, a game or skill, or a hybrid game of chance/game of skill), similar to a gaming device as described herein.

Figure 4:
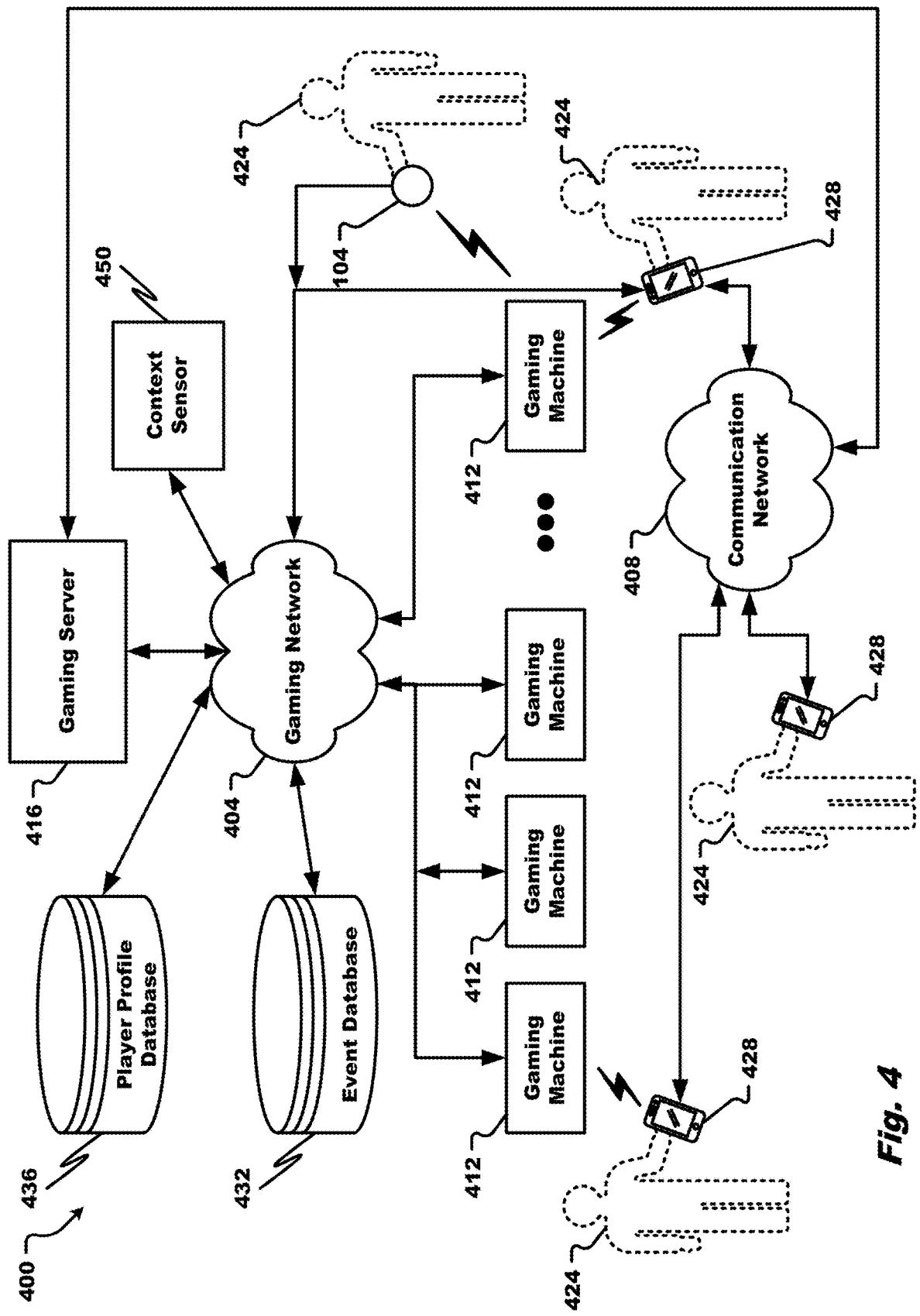
FIG. 4 illustrates a gaming system in accordance with embodiments of the present disclosure.

With reference initially to FIG. 4, details of an illustrative gaming system 400 will be described in accordance with at least some embodiments of the present disclosure. The components of the gaming system 400, while depicted as having particular instruction sets and devices, is not necessarily limited to the examples depicted herein. Rather, a system according to embodiments of the present disclosure may include one, some, or all of the components depicted in the system 400 and does not necessarily have to include all of the components in a single device. The illustration of a single gaming server 416 is for ease of discussion and should not be construed as limiting embodiments of the present disclosure to a single-server architecture.

The gaming system 400 is shown to include a gaming network 404 and a communication network 408. The gaming network 404 may correspond to a distributed set of devices that interconnect and facilitate machine-to-machine communications between one or multiple gaming machines 412 and the gaming server 416. The communication network 408 may correspond to a distributed set of devices that interconnect and facilitate machine-to-machine communications between the gaming server 416 and mobile devices 428 carried by players 424. In some embodiments, the gaming network 404 and communication network 408 may correspond to different networks administered and/or maintained by different entities. In such a scenario, one or more of a gateway, firewall, or similar network border device may reside between the gaming network 404 and the communication network 408 (e.g., to maintain security preferences/settings of each network). In another possible scenario, the gaming network 404 and communication network 408 may correspond to the same or similar network. As a non-limiting example of the second scenario, the gaming network 404 and communication network 408 may both correspond to a distributed Internet Protocol (IP)-based communication network, such as the Internet.

A gaming network 404 and communication network 408 may include any type of known communication medium or collection of communication media and may use any type of protocols to transport messages between devices. As some non-limiting examples, the gaming network 404 may correspond to a WAN or LAN in which the plurality of gaming machines 412 are configured to communicate with the gaming server 416 using devices that are owned and administered by the same entity that administers security settings of the gaming machines 412. As such, the gaming network 404 may be considered a secure or trusted network.

The communication network 408, in some embodiments, may also include a WAN or LAN. Alternatively or additionally, the communication network 408 may include one or more devices that are not administered by the same entity administering the gaming machines 412. Thus, the communication network 408 may be considered an untrusted or unsecure network from the perspective of the gaming network 404. The Internet is an example of the communication network 408 that constitutes an IP network consisting of many computers, computing networks, and other communication devices located all over the world, which are connected through many telephone systems and other means. Other examples of the communication network 408 include, without limitation, a standard Plain Old Telephone System (POTS), an Integrated Services Digital Network (ISDN), the Public Switched Telephone Network (PSTN), a cellular network, and any other type of packet-switched or circuit-switched network known in the art. In some embodiments, the communication network 408 may be administered by a Mobile Network Operator (MNO) whereas a casino entity may administer the gaming network 404.

It should be appreciated that the gaming network 404 and/or communication network 408 need not be limited to any one network type, and instead may be comprised of a number of different networks and/or network types. Moreover, the gaming network 104 and/or communication network 408 may comprise a number of different communication media such as coaxial cable, copper cable/wire, fiber-optic cable, antennas for transmitting/receiving wireless messages, wireless access points, routers, and combinations thereof.

In some embodiments, the gaming machines 412 may be distributed throughout a single property or premises (e.g., a single casino floor) or the gaming machines 412 may be distributed among a plurality of different properties. In a situation where the gaming machines 412 are distributed in a single property or premises, the gaming network 404 may include at least some wired connections between network nodes (e.g., a LAN or multiple LANs). As a non-limiting example, the nodes of the gaming network 404 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming machines 412 may utilize the same or different types of communication protocols to connect with the gaming network 404. It should also be appreciated that the gaming machines 412 may or may not present the same type of game to a player 424. For instance, the first gaming machine 412 may correspond to a gaming machine that presents a slot game to the player 424 whereas a second gaming machine 412 may correspond to a gaming machine that presents a different type of slot game or a video poker game to a player 424. It should be appreciated that a gaming machine 412 may correspond to one example of a gaming device. It should also be appreciated that the functions and features described in connection with a gaming machine 412 may be provided in any other type of gaming device without departing from the scope of the present disclosure.

In some embodiments, the gaming machines 412 may be configured to communicate with a centralized management server in the form of the gaming server 416. The gaming server 416 may be configured to centrally manage games of chance, games of skill, or hybrid games of chance/skill played at the gaming machines 412 (e.g., slot games), enable execution of a different game (e.g., a lottery game), monitor player 424 activity at the gaming machines 412, track player 424 association with a gaming machine 412, facilitate communications with players 424 via the gaming machines 412, facilitate communications with players 424 via the mobile devices 428 (or other gaming devices), and/or perform any other task in connection with games played by a player 424 at gaming devices.

The context sensor 450 can collect additional context information for use in controlling the sensory feedback response behavior of the gaming venue token(s). While the context sensor 240 and context sensor instructions 260 can collect context information regarding the token itself or its immediate environment, the context sensor 450 can collect context information over a much broader area, such as over a gaming table or over the spatial area of the entire gaming system. For example, the context sensor 450 can assist the context sensor 240 and/or context sensor instructions 260 in sensing a current spatial position or location of the gaming venue token. The position can be relative to a coordinate system or selected object or location. By way of illustration, the context sensor 540 can be part of a Wi-Fi based positioning system (which measures the intensity of received wireless signals (or received signal strength)).

The context sensor 450 can collect or assist the context sensor 240 in collecting, as contextual information, information regarding an ambient condition in spatial proximity to the gaming venue token or the gaming device associated with the gaming venue token. By way of illustration, the context sensor 450 can collect information relating to ambient sound and light in spatial proximity to the gaming venue token. The context sensor 450 can be, for instance, an audio and/or video recorder to record or stream audio and/or video of a game event or player, a microphone to detect sound, passive infrared detector, active ultrasonic wave-emitting detector, active ultrasonic detector, passive ultrasonic detector, microwave detector, or proximity detector to detect nearby persons, a photoresistor, photovoltaic light sensor, light dependent sensor, or photo diode to detect light or light intensity, and the like.

In some embodiments, a player 124 may be enabled to enhance their experience with the gaming machines 412 via interactions with their personal mobile device 428. In some embodiments, a mobile device 428 may be configured to execute one or more games of chance, one or more games of skill, and/or one or more hybrid games of chance/skill that are also executable by a gamine machine 412. Thus, in some embodiments, a mobile device 428 may be considered another example of a gaming device. In some embodiments, the mobile device 428 may be referred to as a personal gaming device that is configured to be owned and carried by a player 424. For instance, a player 424 may be allowed to play a game at their mobile device 428 without ever having to physically engage a gaming machine 412. The mobile device 428 may correspond to a mobile communication device, such as a smartphone, tablet, laptop, PDA, wearable device, an augmented reality headset, a virtual reality headset, or the like. In other embodiments, the mobile device 428 may correspond to a PC, kiosk, or the like that facilitates improved lottery game play for the player 424. Any of the above-mentioned examples of a mobile device 428 may correspond to an example of a gaming device as described herein.

In some embodiments, a mobile device 428 may be configured to communicate directly with a gaming machine 412. In some embodiments, some or all of the game play may be achieved with the mobile device 428 rather than relying on the use of a gaming machine 412. Where a mobile device 428 interacts with a gaming machine 412, direct machine-to-machine communications may utilize a proximity-based communication protocol such as NFC, Bluetooth®, BLE, WiFi, or the like. Alternatively or additionally, the mobile devices 428 may be configured to communicate with other mobile devices 428 and/or the gaming server 416 via the communication network 408. Such communications may be secured (e.g., encrypted) or unsecured depending upon the nature of information exchanged during the communications. A mobile device 428 may correspond to a player's 424 personal device that uses an unsecured or untrusted communication network 408 or to a device issued to the player 424 during the player's visit at a particular casino, in which case the mobile device 428 may be administered with certain casino-approved security policies.

It should be appreciated that the gaming server 416 may or may not be co-located with the gaming machines 412. Further still, players 424 may be allowed to carry multiple mobile devices 428, which may or may not be required to communicate or pair with a gaming machine 412.

FIG. 4 also depicts the possibility of some mobile devices 428 or tokens 104 being paired with a gaming machine 412, thereby enabling communications to flow between the mobile device 428 or token 104 and gaming machine 412. This communication may utilize a proximity-based communication protocol, such as Bluetooth, BLE, NFC, WiFi, etc. FIG. 4 further shows that one or more mobile devices 428 or tokens 104 may not necessarily be paired with a gaming machine 412, but such mobile devices 428 or tokens 104 may still be configured to communicate with the gaming server 416 via the communication network 408. Communications between the gaming machine 412 and mobile device 428 may facilitate any number of combinations of gameplay opportunities.

Figure 5:
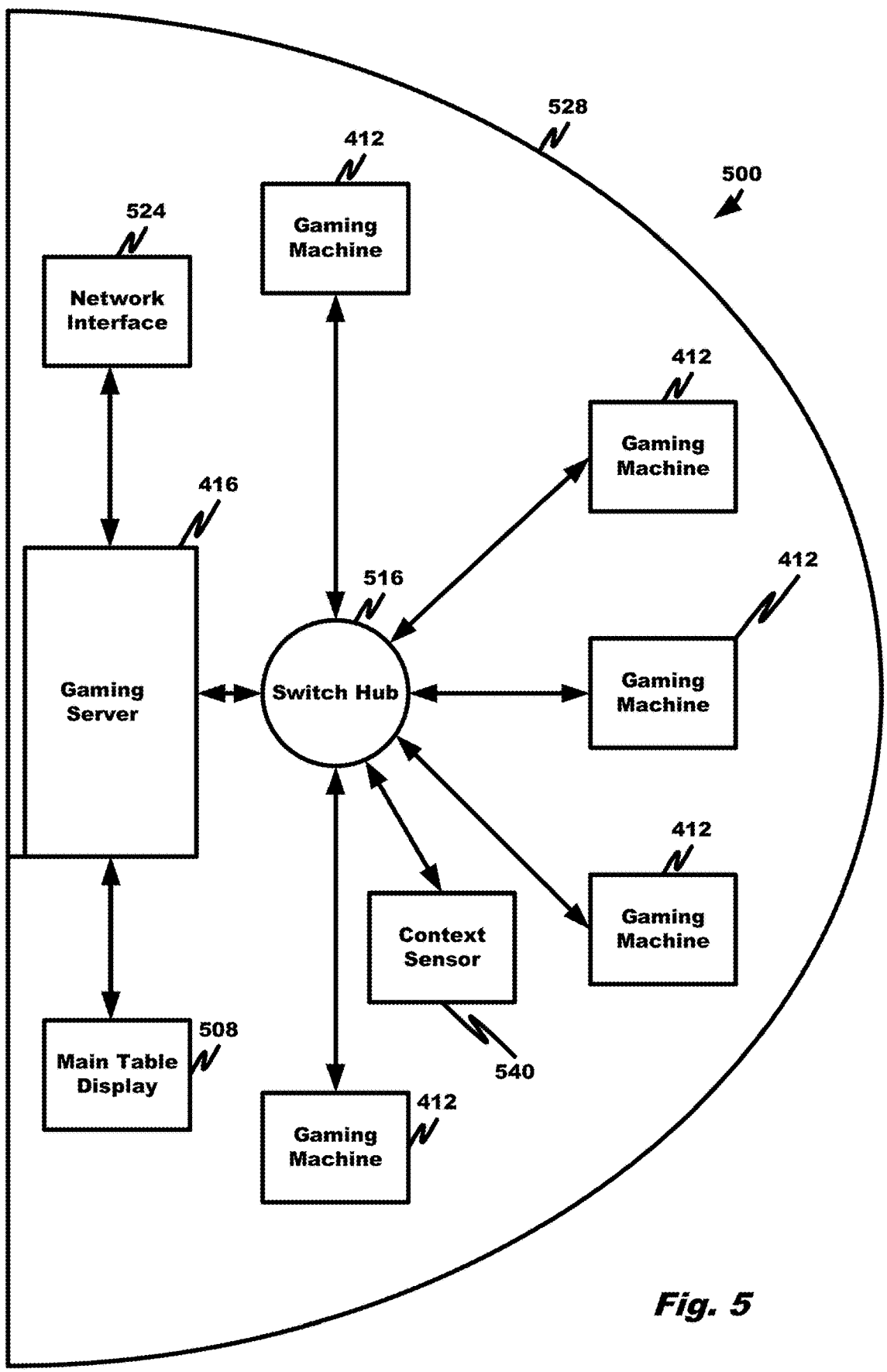
FIG. 5 depicts a gaming system in accordance with embodiments of the present disclosure.

Referring to FIG. 5, a multi-player ETG system 500 according to another embodiment is depicted. The ETG system 500 includes an ETG 528 having a gaming server 416 or master table controller (MTC), a main multi-touch table display system 508, and a plurality of player station gaming systems 412 and context sensor 540, which, for example, may be connected to the gaming server 416 via at least one switch or hub 518. In at least one embodiment, the gaming server 416 may include at least one processor and memory (not shown). Additionally, the ETG system 500 may also include one or more network interfaces 524 for communicating with other devices and/or systems in a casino network. The ETG system 500 can be used with card games and other games of chance or skill, including dice games, such as craps and sic bo, and roulette and wheel games.

Figure 6:
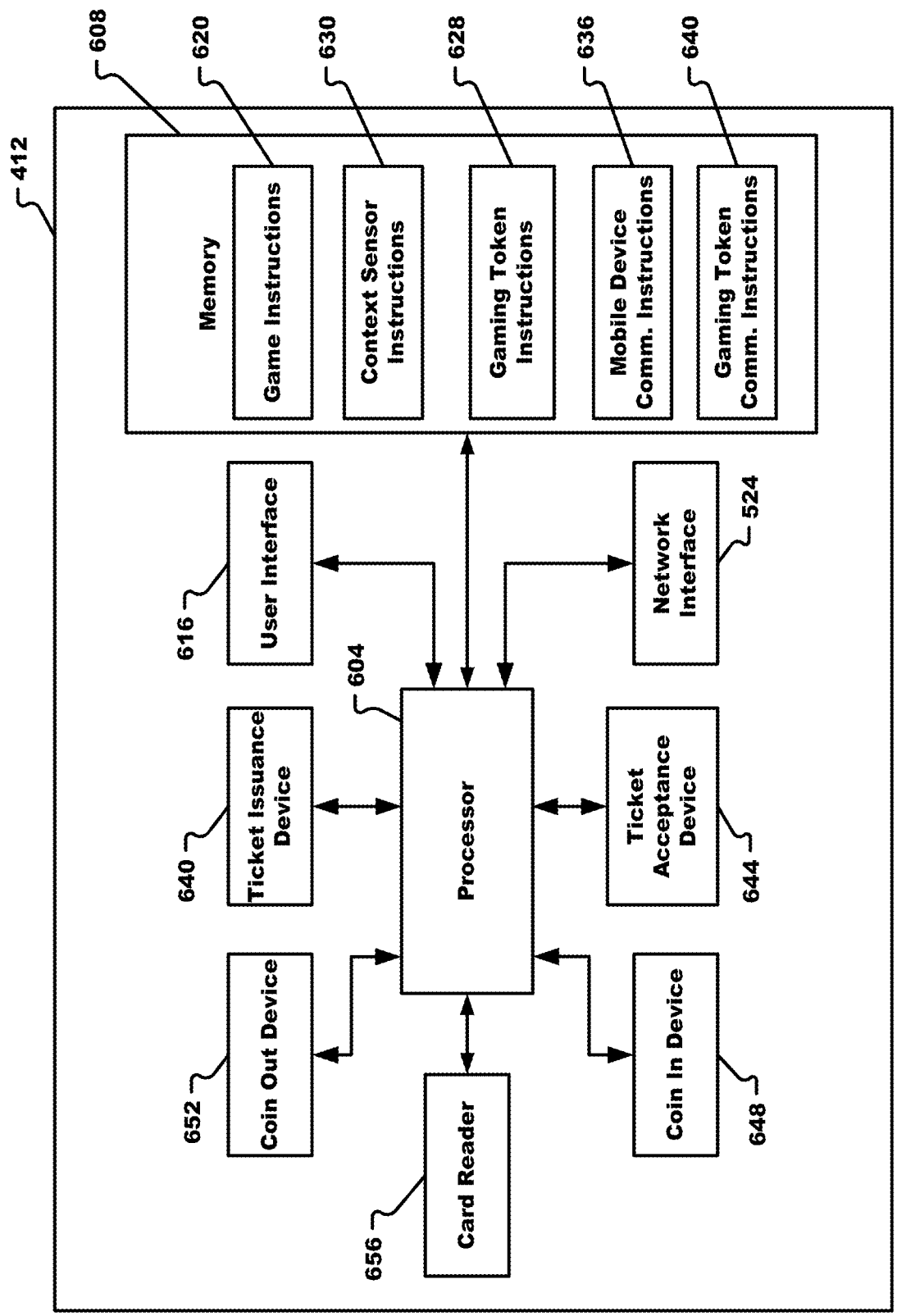
FIG. 6 depicts a gaming device in accordance with embodiments of the present disclosure.

With reference to FIG. 6, additional details of the components that may be included in a gaming machine 412 or any other gaming device will be described in accordance with at least some embodiments of the present disclosure.

A gaming machine 412 may correspond to a portable or non-portable device used for executing a gaming application or multiple different gaming applications without departing from the scope of the present disclosure. Non-limiting examples of a gaming machine 412 include an EGM, a VGM, EGT, VR gaming machine, AR gaming machine, a mobile communication device (e.g., a smartphone, laptop, wearable device, etc.), a laptop, a PC, etc. The illustrative gaming machine 412 depicted herein may include a support structure, housing or cabinet, which provides support for a plurality of displays, inputs, controls and other features of a conventional gaming machine. In some embodiments, a player 424 plays gaming machine 412 while sitting, however, the gaming machine 412 is alternatively configured so that a player can operate it while standing or sitting. The illustrated gaming machine 412 can be positioned on the floor but can be positioned alternatively (i) on a base or stand, (ii) as a pub-style table-top game (e.g., where the participant computational devices are located remotely from the shared wheel as discussed below), (iii) as a stand-alone computational device on the floor of a casino with other stand-alone computational devices, or (iv) in any other suitable manner. The gaming machine 412 can be constructed with varying cabinet and display configurations.

The gaming machine 412 is shown to include a processor 604, memory 608, a network interface 524, and a user interface 616.

In some embodiments, the processor 604 may correspond to one or many microprocessors, CPUs, microcontrollers, Integrated Circuit (IC) chips, or the like. For instance, the processor 604 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 604 may be provided as a microcontroller, microprocessor, Central Processing Unit (CPU), or plurality of microprocessors that are configured to execute the instructions sets stored in memory 608. In some embodiments, the instruction sets stored in memory 608, when executed by the processor 604, may enable the gaming machine 412 to provide game play functionality.

The nature of the network interface 524 may depend upon whether the network interface 524 is provided in cabinet-style gaming machine 412 or a mobile gaming machine 412. Examples of a suitable network interface 524 include, without limitation, an Ethernet port, a USB port, an RS-232 port, an RS-485 port, a NIC, an antenna, a driver circuit, a modulator/demodulator, etc. The network interface 524 may include one or multiple different network interfaces depending upon whether the gaming machine 412 is connecting to a single gaming network 404 or multiple different types of gaming networks 404. For instance, the gaming machine 412 may be provided with both a wired network interface 524 and a wireless network interface 524 without departing from the scope of the present disclosure.

The user interface 616 may include a combination of user input devices and user output devices. For instance, the user interface 616 may include a display screen, speakers, buttons, levers, a touch-sensitive display, or any other device that is capable of enabling player 424 interaction with the gaming machine 412. The user interface 616 may also include one or more drivers for the various hardware components that enable player 424 interaction with the gaming machine 412.

The memory 608 may include one or multiple computer memory devices that are volatile or non-volatile. The memory 608 may include volatile and/or non-volatile memory devices. Non-limiting examples of memory 608 include Random Access Memory (RAM), Read Only Memory (ROM), flash memory, Electronically-Erasable Programmable ROM (EEPROM), Dynamic RAM (DRAM), etc. The memory 608 may be configured to store the instruction sets depicted in addition to temporarily storing data for the processor 604 to execute various types of routines or functions. The memory 608 may be configured to store instruction sets that enable user interaction with the gaming machine 412 and that enable game play at the gaming machine 4v12. Examples of instruction sets that may be stored in the memory 608 include a game instruction set 620, gaming token instructions 628 and context sensor instructions 630. In addition to the instruction sets, the memory 608 may also be configured to store a random number generator (not shown) that is used by the game instruction set 620, for example, to provide game outputs. The gaming machine 412 is also shown to include a mobile device communication instruction set 636 and gaming token communication instructions set 640 that may enable the gaming machine 412 to exchange electronic communications, either directly or indirectly, with a mobile device 428 or the gaming token 104, respectively.

In some embodiments, the game instruction set 620, when executed by the processor 604, may enable the gaming machine 412 to facilitate one or more games of chance and/or skill and produce interactions with the player. In some embodiments, the game instruction set 620 may include subroutines that present one or more graphics to the player via the user interface 616, subroutines that calculate whether a particular wager using tokens 104 has resulted in a win or loss during the game of chance and/or skill, subroutines for determining payouts for the player in the event of a win during the first game of chance, subroutines for exchanging communications with another device, such as server 416, subroutines for determining bonus spin opportunities during game play, and any other subroutine useful in connection with facilitating game play at the gaming machine 412.

The context sensor instruction set 630 may correspond to an instruction set within the gaming machine 412 that facilitates a tracking of wager activity at the gaming machine 412. In some embodiments, the context sensor instruction set 630, when executed by the processor 604, may be used to store or log information related to various player activities and events that occur at the gaming machine 412. The types of information that may be collected and maintained by the context sensor instructions 630 include, without limitation, player information, available credit information, wager amount information, game state information, game events, and other types of information that may or may not need to be recorded for purposes of accounting for wagers placed at the gaming machine 412 and payouts made for a player during a game of chance and/or skill played at the gaming machine 412.

In some embodiments, the context sensor instructions 630 may be configured to track coin in activity, coin out activity, coin drop activity, jackpot paid activity, credits applied activity, external bonus payout activity, voucher in activity, voucher out activity, timing of events that occur at the gaming machine 412, and the like.

The mobile device communication instruction set 636, when executed by the processor 604, may enable the gaming machine 412 to communicate with the mobile device 428 or multiple mobile devices 428, and the gaming token communication instruction set 640, when executed by the processor 604, may enable the gaming machine 412 to communicate with a gaming token 104 or multiple gaming tokens 104. In some embodiments, the mobile device communication instruction set 636 or gaming token communication instruction set 640 may include instructions that enable the gaming machine 412 to pair with a mobile device 428 or gaming token 104 (as the case may be) and establish a communication channel with the mobile device 428 or gaming token 104 via the pairing. As an example, the mobile device communication instruction set 636 or gaming token communication instruction set 640 may include instructions that enable NFC, Bluetooth®, WiFi, or other types of communication protocols. It should be appreciated that the mobile device communication instruction set 636 or gaming token communication instruction set 640 may also be updated to reflect when a mobile device 428 or gaming token 104 (as the case may be) is paired with the gaming machine 412 and such pairing information may include addressing information for the mobile device 428 or gaming token 104 and/or identification information associated with the player 424 of the mobile device 428 or gaming token 104. Alternatively or additionally, the mobile device communication instructions 636 or gaming token communication instruction set 640 may enable the gaming machine 412 to identify a player 424 of the mobile device 428 or gaming token 104, identify a loyalty account associated with the player 424 of the mobile device 428 or gaming token 104, exchange information (e.g., send or receive) with a loyalty application operating on the mobile device 428, or combinations thereof. This information may be provided to the context sensor 240, 450, or 540 or processor 248 or 604 executing the context sensor instructions 260 or 630. In some embodiments, the mobile device communication instructions 636 or gaming token communication instruction set 640 may be configured to operate or drive the network interface 524 to facilitate direct or indirect communications with a mobile device 428 or gaming token 104 (as the case may be).

The gaming token instructions 628, which may be the same as the gaming token instructions 280, receive the sensed context information from the context sensor 240, 450, or 540 or processor 248 or 604 executing the context sensor instructions 260 or 630 and, based on the sensed context information, causes a selected sensory user feedback response, such as color, video, sound, and/or movement, to be demonstrated by the physical or digital gaming token 104. For example, the illuminated circumferential band 112 and/or display 108 of the gaming token 104 can change colors or color intensity or pulsate in color based on sensed context information, such as player and/or event information 424. The gaming token display 108 can display a symbol or video based on sensed context information. The gaming token 104 can move or vibrate or change in shape or size based on sensed context information. The gaming token 104 can play sound sequences or sets of sounds based on sensed context information. The gaming token 104 can simultaneously exhibit or generate combinations of these sensory user feedback responses or behaviors.

While shown as separate instruction sets, it should be appreciated that the gaming token instruction set 628 may correspond to a subroutine of the game instruction set 620 without departing from the scope of the present disclosure.

The gaming machine 412 is further shown to include a ticket issuance device 640, a ticket acceptance device 644, a coin in device 648, a coin out device 652, and a card reader 656. The ticket issuance device 640 may be configured to print physical tickets, vouchers, or the like. The ticket acceptance device 644 may be configured to receive, scan, and/or recognize information from an input physical ticket, voucher, or cash. In some embodiments, the ticket issuance device 640 and ticket acceptance device 644 may operate in concert with a common piece of hardware that both accepts and produces physical tickets, vouchers, or the like. Tickets or vouchers printed by ticket issuance device 640 and recognizable by the ticket acceptance device 644 may correspond to physical lottery tickets, casino vouchers, paper coupons, and the like. Alternatively or additionally, the ticket issuance device 640 and/or ticket acceptance device 644 may be connected to ticket or cash reading hardware. In such an embodiment, the ticket issuance device 640 and ticket acceptance device 644 may operate as a driver and/or firmware component for the card reader.

Similarly, the coin in device 648 and coin out device 652 may include hardware or operate in concert with a coin slot or any other type of coin delivery mechanism. The coin in device 648 and coin out device 652 may include hardware, drivers, or firmware that facilitate receiving or distributing tokens, coins, chips, etc. In some embodiments, the coin in device 648 may be configured to determine an amount of coins (an amount of tokens, an amount of chips, etc., input at the coin slot and convert the values into credits for playing games with the game instruction set 620. The coin out device 652 may correspond to hardware and software configured to output coins, tokens, chips, etc. if a player decides to cash out or convert playing credits back into coins, tokens, or chips, etc.

The card reader 656 may include hardware and/or software configured to read or accept any type of card, gaming venue token 104, or portable credential or a gaming token 104. In some embodiments, the card reader 656 may include hardware and/or software that enable contactless reading of a card, gaming venue token 104, or portable credential (e.g., NFC, Bluetooth, Wifi, etc.). In some embodiments, the card reader 656 may include hardware and/or software that enable contact-based reading of a card, gaming venue token 104, or portable credential (e.g., magstripe, chip reader, electrodes, card-receiving slot, etc.). It should be appreciated that the card reader 656 may be configured to receive and reader a card or portable credential or gaming token 104 in any type of format (e.g., portable plastic card, magstripe card, key fob, etc.). It should also be appreciated that the card reader 656 may be configured to write information or data onto a card or portable credential or gaming token 104. Furthermore, in some embodiments, the card reader 656 may be configured to read a player loyalty card in the form of a plastic credit-card shaped credential. In some embodiments, the card reader 656 may enable communications with a loyalty application operating on a player's mobile device 428. In some embodiments, the gaming token 104 acts as a type of card or portable credential and wirelessly communicates to the gaming machine 412 the identity, credential, and/or account information of the player. In some embodiments, the gaming token 104 acts as a type of card or portable credential and wirelessly communicates to the network interface 524 or card reader 656 gaming machine 412 game credits, thereby allowing the player to load game credits onto the gaming machine 412.

Figure 7:
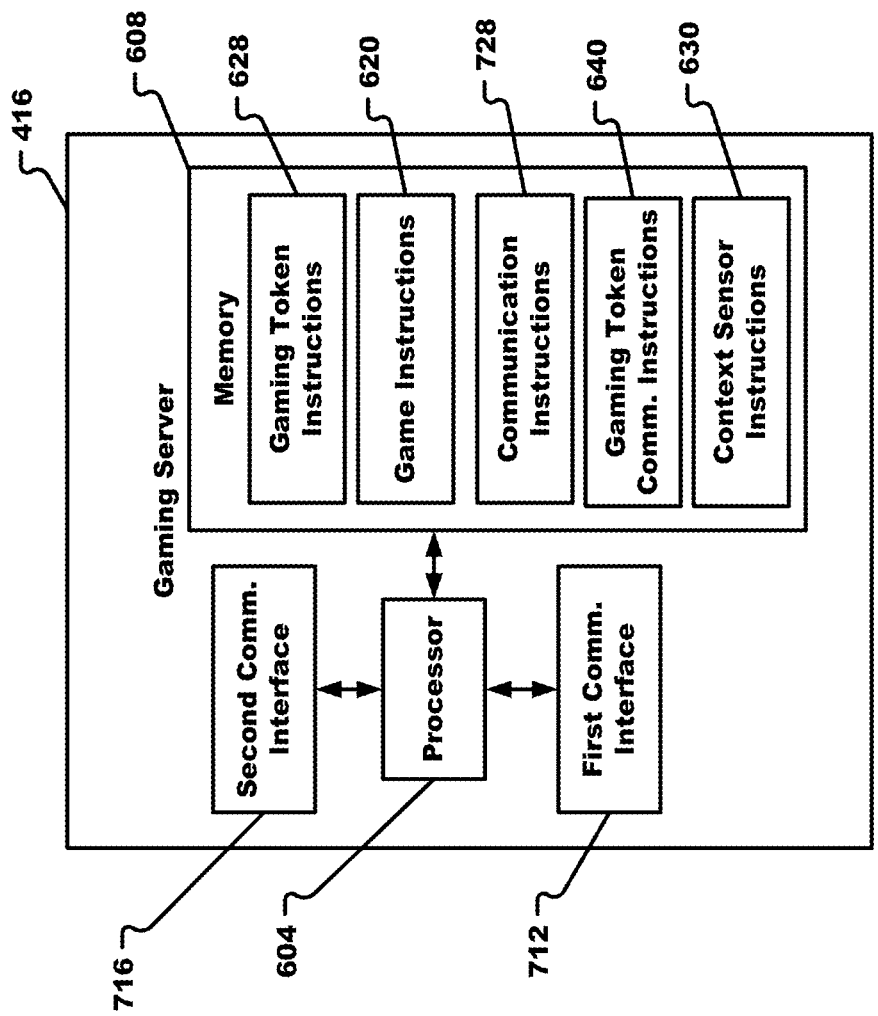
FIG. 7 depicts a gaming server in accordance with embodiments of the present disclosure.

With reference now to FIG. 7, additional details of a gaming server 416 will be described in accordance with embodiments of the present disclosure. The gaming server 416 is shown to include a processor 604, memory 608, and a plurality of communication interfaces 712, 716. These resources may enable functionality of the gaming server 416 as will be described herein. For instance, the first communication interface 712 may provide the gaming server 416 with the ability to send and receive communication packets or the like over the gaming network 404. The first communication interface 712 may be provided as a network interface card (NIC), a network port, drivers for the same, and the like. Communications between the components of the gaming server 416 and other devices connected to the gaming network 404 may all flow through the first communication interface 712.

The gaming server 416 is also shown to include a second communication interface 716 that facilitates communications with the mobile devices 428 via the communication network 408. In some embodiments, the second communication interface 716 may be similar to the first communication interface 712. For instance, the second communication interface 716 may also include a NIC, network port, drivers for the same, and the like. In some embodiments, the first and second communication interfaces 712, 716 may be provided in a single physical component or set of components, but may correspond to different communication channels (e.g., software-defined channels, frequency-defined channels, amplitude-defined channels, etc.) that are used to send/receive different communications to the mobile devices 428 as compared to the gaming machines 412. In some embodiments, a single communication interface may facilitate communications with both the gaming machines 412 and mobile devices 428, especially if both devices communicate with the gaming server 416 via a common network.

The processor 604 may correspond to one or many computer processing devices. The processor 604 may be configured to execute one or more instruction sets stored in memory 608. Upon executing the instruction sets stored in memory 608, the processor 604 enables various authentication functions of the gaming server 416.

The memory 608 may include any type of computer memory device or collection of computer memory devices. The illustrative instruction sets that may be stored in memory 608 include, without limitation, gaming token instruction set 628, game instruction set 620, a communication instruction set 700, gaming token communication instruction set 640, and a context sensor instruction set 630. Functions of the gaming server 416 enabled by these various instruction sets will be described in further detail herein. It should be appreciated that the instruction sets depicted in FIG. 7 may be combined (partially or completely) with other instruction sets or may be further separated into additional and different instruction sets, depending upon configuration preferences for the gaming server 416. Said another way, the particular instruction sets depicted in FIG. 7 should not be construed as limiting embodiments described herein.

Although not depicted, the gaming server 416 may include instructions that enable a processor to store data into the player profile database 436 and/or event database 432 and retrieve information from the databases 436, 432. Alternatively or additionally, the player profile database 436 or data stored therein may be stored internal to the gaming server 416 (e.g., within the memory of the server 416 rather than in a separate database). Alternatively or additionally, the event database 432 or data stored therein may be stored internal to the gaming server 416.

The operations of the gaming token instruction set 628, game instruction set 620, and gaming token communication instruction set 640 have been discussed above with respect to FIG. 6.

The context sensor instructions 630, in addition to the context information referenced above, can collect additional context information for use in controlling the sensory feedback response behavior of the gaming venue token(s).

For example, the context sensor instructions 630 can collect event information from the event database 432. The database 432 may be configured to store one or multiple data structures that are used in connection with gaming activities. In some embodiments, the data stored in the data structures may be stored for a plurality of different games or for a single game. The data structure may include a plurality of data fields that include, for instance, an event information field. The event information may describe events or activities in a game. Generally, an event is identified by an event handler detecting an event associated with a gaming operation. Exemplary events include acceptance of wagers from the players, the wagers that are placed by each player, closure of wagering, gaming activity or operation in progress (e.g., ball dropped in roulette, cards being dealt in a card game, dice being rolled in a dice game, reels rolling (in slots), and outcome of gaming activity or operation (including payouts (e.g., winnings and losses) by player). In some embodiments, the database can include video recordings and still images of players and audio recordings of the players during the game.

By way of further illustration, the context sensor instructions 630 can collect player information from the player information database 436. The database 436 may be configured to store one or multiple data structures that are used in connection with gaming activities of a specific player. In some embodiments, the data stored in the data structures may be stored for a plurality of different players or for a single player. The data structure may include a plurality of data fields that include, for instance, a player information field, a wager credit field, an award information field, and an award history field. The player information field may be used to store any type of information that identifies or describes a player. In some embodiments, the 424 information field may store one or more of username information for a player 424, contact information for the player 424 (such as email address, phone number, social website webpage universal resource locator, and the like), password information for a player account, player status information (including current player 424 spatial location within the casino), accommodations associated with the player 424, and any other type of customer service management data that may be stored with respect to a player 424. The wager credit field may further store information describing a player's available credit over time, wagers made over time, cash out events for the player 424, winning events for the player 424, and the like. The award information field may be used to store information describing awards that have been paid to the player 424 or that are available to be paid in response to particular events occurring within the gaming system 400 or a gaming machine 412. The award history field may also indicate when such awards were granted to the player 424, whether the awards have been redeemed, whether the awards are being funded by a game of chance and/or skill, a mini bonus associated with an event, or a side bet award associated with the occurrence or nonoccurrence of an event.

The communication instruction set 700, when executed by the processor 604, may enable the gaming server 416 to communicate with the other devices in the system 400. For instance, the communication instruction set 700 may be configured to modulate/demodulate communications exchanged over the gaming network 404 and/or communication network 408, determine timings associated with such communications, determine addresses associated with such communications, etc. In some embodiments, the communication instruction set 700 may be configured to allocate communication ports of the gaming server 416 for use as either the first or second communication interface 712, 716 as appropriate. The communication instruction set 700 may further be configured to generate messages in accordance with communication protocols used by the networks 404, 408 and to parse messages received via the networks 404, 408.

Figure 8:
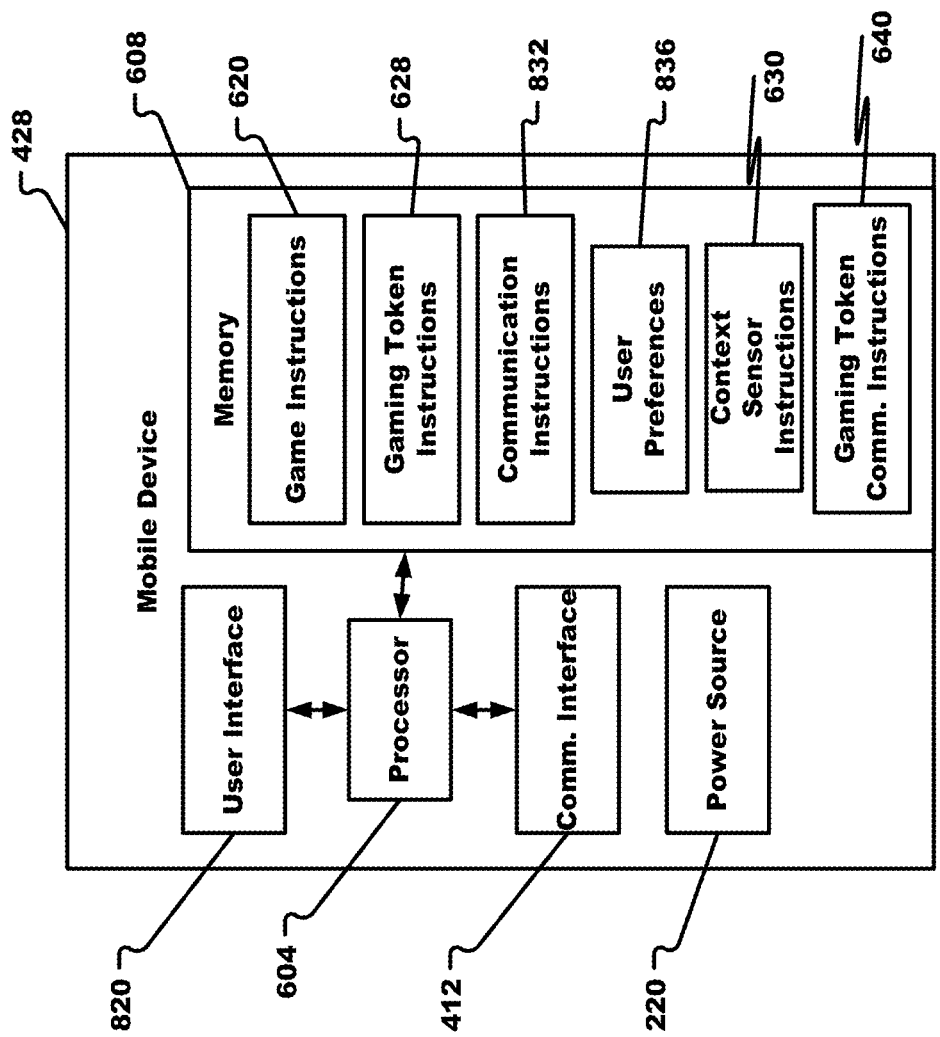
FIG. 8 depicts a mobile device in accordance with embodiments of the present disclosure.

With reference now to FIG. 8, additional details of the components that may be included in a mobile device 428 will be described in accordance with at least some embodiments of the present disclosure. The mobile device 428 is shown to include a processor 604, memory 608, a communication interface 812, and a user interface 616. The processor 604 may be configured to execute one or more instruction sets stored in memory 608. In some embodiments, the instruction sets stored in memory 608, when executed by the processor 604, may enable the mobile device 428 to provide game play functionality, interact with gaming machines 412, pair with gaming machines 412, pair with gaming tokens 104, or any other type of desired functionality.

The communication interface 812 may be similar or identical to the network interface 212 and/or communication interfaces 712, 716 depicted and described herein. The nature of the communication interface 812 may depend upon the type of communication network 408 for which the mobile device 428 is configured. Examples of a suitable communication interfaces 812 include, without limitation, a WiFi antenna and driver circuit, a Bluetooth antenna and driver circuit, a cellular communication antenna and driver circuit, a modulator/demodulator, etc. The communication interface 812 may include one or multiple different network interfaces depending upon whether the mobile device 428 is connecting to a single communication network 408 or multiple different types of communication networks. For instance, the mobile device 428 may be provided with both a wired communication interface 812 and a wireless communication interface 812 without departing from the scope of the present disclosure.

The user interface 820 may include a combination of user input and user output devices. For instance, the user interface 820 may include a display device, a microphone, a speaker, a haptic feedback device, a light, a touch-sensitive display, a button, or a combination thereof. The user interface 820 may also include one or more drivers for the various hardware components that enable user interaction with the mobile device 428.

The memory 608 may be configured to store instruction sets that enable user interaction with the mobile device 428 and that enable game play at the mobile device 428. Examples of instruction sets that may be stored in the memory 608 include a game instruction set 620, gaming token instruction set 628, communication instruction set 832, context sensor instruction set 630, and gaming token communication instruction set 640. In addition to the instruction sets, the memory 608 may also be configured to store data that is useable by the various instruction sets. Examples of such data that may be stored in memory 608 include, without limitation user preferences 836.

The operations of the gaming token instruction set 628, game instruction set 620, gaming token communication instruction set 640, and context sensor instruction set 630 have been discussed above with respect to FIG. 6.

The communication instruction set 832, when executed by the processor 604, may enable the mobile device 428 to communicate via the communication network 408. In some embodiments, the communication instruction set 832 may be similar or identical to the communication instruction set 700 and may be particular to the type of communication network 408 used by the mobile device 428. As an example, the communication instruction set 832 may be configured to enable cellular, WiFi, and/or Bluetooth communications with other devices. The communication instruction set 832 may follow predefined communication protocols and, in some embodiments, may enable the mobile device 428 to remain paired with a gaming machine 412 or gaming token 104 as long as the mobile device 428 is within a predetermined proximity (e.g., 20-30 feet, an NFC communication range, or a Bluetooth communication range) and paired with the gaming machine 412.

The user preferences 836 may correspond to gaming or wager preferences that are desired by the player 424 of the mobile device 428. In some embodiments, where the mobile device 428 is not owned by the player 424, but rather is loaned to the player 424 by a casino operator, the user preferences 836 may include default preferences defined by the casino as well as other preferences that are defined by the player 424 after receiving the mobile device 428. The user preferences 836 may alternatively or additionally relate to communication preferences that drive operation of the communication instruction set 832. In some embodiments, the user preferences 836 may include gaming token preferences controlling the sensory feedback response provided by the gaming token under a predetermined context, or a set of context information, and may enable automated selection or assignment of the sensory feedback response to be provided by the gaming token 104. The gaming machine 412, gaming token 104, and mobile device 428 may be configured to communicate with one another and, in some embodiments, the context sensor instructions 630, when executed by the processor 604 of the mobile device 428, may provide some or all of the user preferences 836 to the gaming token 104 for use during a game play session or at least until the player 424 leaves the gaming machine 412 (e.g., as determined by the mobile device 428 leaving the predetermined proximity of the gaming machine 412).

By way of illustration, player 424 can, by user preferences 836, select the color of the illuminated circumferential band 112 and/or displayed content of the display 108 of the gaming token. Alternatively or additionally, the user preferences 836 can select the content or media or multimedia to be displayed by the display 108 or output by the speaker 304. For instance, the user preferences can be communicated to the token 104 by a mobile device 428, such as a mobile phone, smart watch, or Augmented Reality (AR) device. The player can choose the color or color pattern via the mobile device, which then wirelessly informs the gaming server 416 or gaming machine 412 about the selection.

Figure 9:
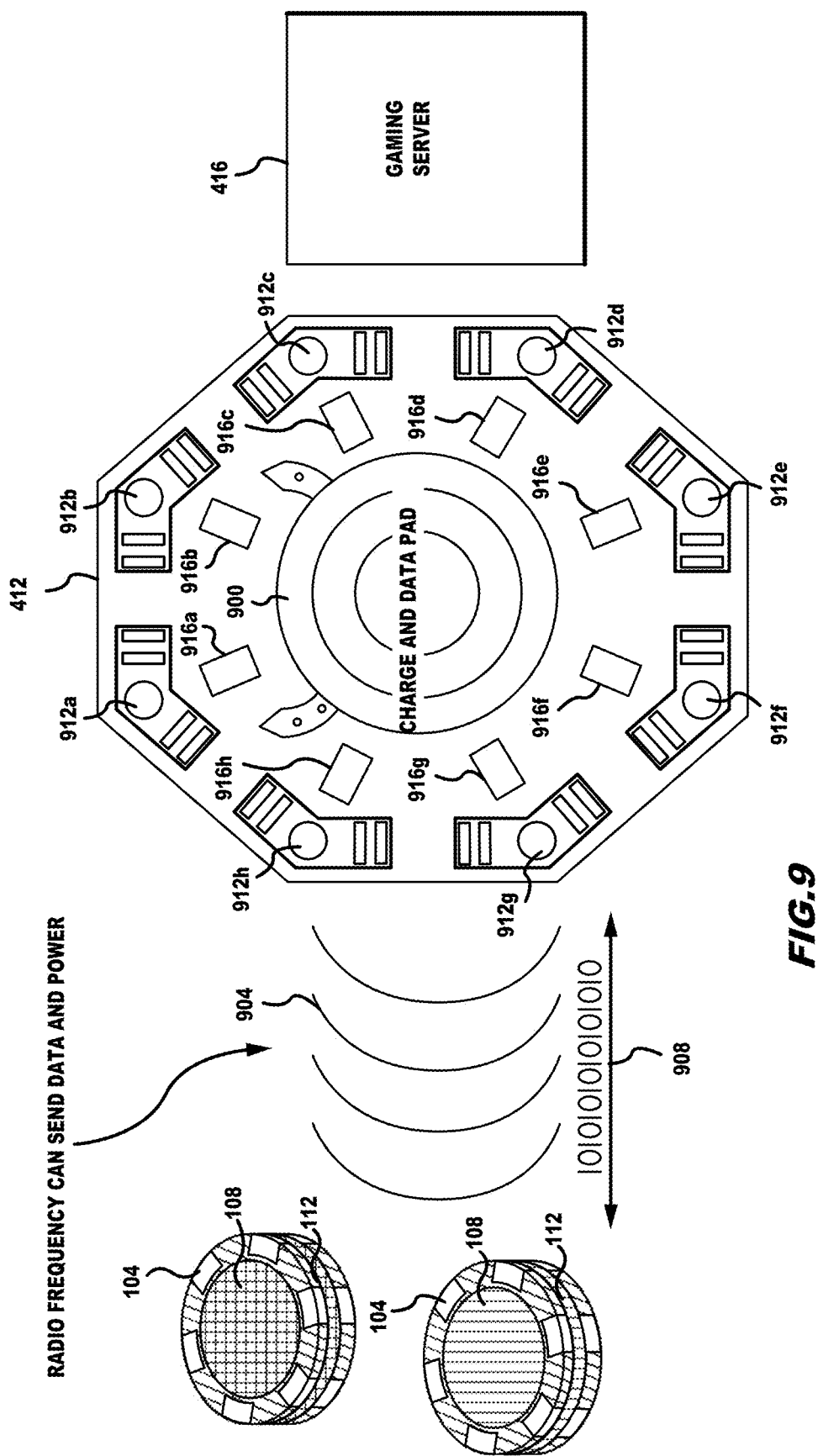
FIG. 9 depicts data and power communications between an electronic gaming table and gaming venue tokens in accordance with embodiments of the present disclosure.

With reference now to FIG. 9, interaction of physical gaming tokens 104 with a gaming machine 412 is depicted in accordance with at least some embodiments of the present disclosure. A gaming machine 412 in the form of a gaming table comprises a plurality of player stations 912a-h around the periphery of the gaming table. Each player station comprises a marked player location 916a-h to receive one or more playing cards, gaming venue tokens 104, or other game pieces or components. The gaming tokens 104 can additionally or alternatively be received in a central area of the gaming machine 412 that comprises a charge and data pad 900. The charge and data pad 900 can wirelessly charge the on-board power source 220 by any suitable technique. As noted above, the charge and data pad 900, in some embodiments, uses electromagnetic (charging) signals to charge the power source 220 and, for instance, increase battery or capacitor charge capacity. The electromagnetic signals can be any frequency, such as radio frequency. In another embodiment, the charge and data pad 900 charges the power source 220 by inductive charging, which uses an electromagnetic field to transfer energy between the charge and data pad 900 and token 104 using electromagnetic induction. In accordance with gaming token communication instructions 640, the charge and data pad 900 can also transmit data signals, such as sensory feedback response commands, to the gaming tokens 104. Likewise, the context sensor 240 or context sensor instruction set 260 in the gaming token can transmit to the charging and data pad 900 sensed context information or data via antenna 202. The exchange of charging and data signals is denoted by arcuate lines 904 and binary data stream 908. Alternatively or additionally, the gaming tokens 104 receive data signals only when the processor 248 determines, from sensed context information of the context sensor 240 or context sensor instruction set 260, that the gaming token 104 can be issued permanent or temporary ID number by the gaming machine 412. Alternatively or additionally, the gaming machine 412 can communicate data signals to the token 104 comprising command logic only when the processor 248 determines, from sensed context information of the context sensor 240 or context sensor instruction set 260, that the gaming token 104 is within a predetermined distance of the gaming machine 412. The gaming tokens can use NFC, Bluetooth, or WiFi for command and data exchange. Alternatively or additionally, the gaming tokens are powered by the power source 220 only when the processor 248 determines, from sensed context information of the context sensor 240 or context sensor instruction set 260, that the gaming token 104 is within a predetermined distance of the gaming machine 412 and/or the charge and data pad 900. For example, the charge and data pad 900 can comprise a wireless charging coil (not shown) for inductive charging and the gaming token can be powered or inductively charged when in the electromagnetic field of the coil. In other configurations, the charge and data pad is incorporated at each player station. This can not only be convenient but also enable the gaming system to determine which gaming tokens belong to which player. In other words, the gaming system can associate gaming tokens with specific players if the gaming tokens are placed at the respective table player station based on pairing or other signals received from the charge and data pad at each player station. As will be appreciated, the charge and data pads can be located anywhere and/or all around the circumference or perimeter of the table. The pads can not only charge the tokens but also inform the system about the location of the tokens.

Figure 10:
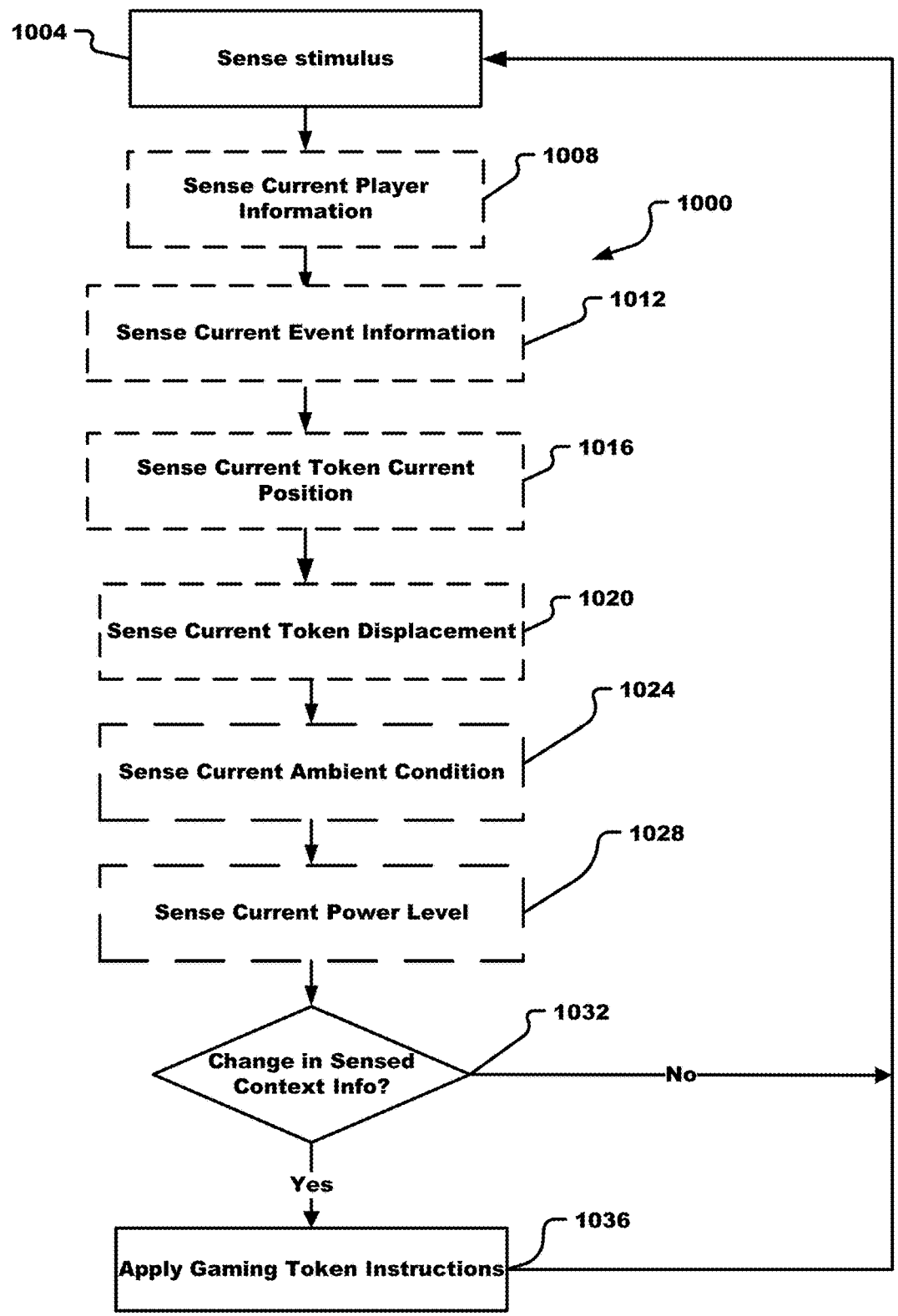
FIG. 10 is a flow chart illustrating context sensor instructions in accordance with embodiments of the present disclosure.

With reference now to FIG. 10, various operations of a gaming venue token 104, gaming machine 412, gaming server 416, and/or mobile device 428 will be described in accordance with at least some embodiments of the present disclosure.

The method 1000 begins when a context sensor 240, 450, or 540 or context sensor instruction set 260 or 630 senses a stimulus (step 1004). The stimulus, for example, can be a passage of a determined period of time, receipt of an update context command such as from another of the gaming venue token 104, gaming machine 412, gaming server 416, or mobile device 428, or sensed change in previously sensed context information (such as sensed movement or player 424 contact with the token 104 or sensed occurrence of a gaming event). This step may occur in response to the player 424 selecting a predetermined button, inserting coins, cash, tickets, vouchers, etc., or performing some other action at the gaming venue token 104, gaming machine 412, or mobile device 428 that indicates a desire to begin game play. The player's 424 input received at the gaming device may be received directly at the gaming machine 412 (e.g., via the user interface 616) or remotely (e.g., via the user interface 820 of the mobile device 428 where the mobile device 428 is used as a remote control of sorts for some other gaming device, such as a gaming machine 412). In some embodiments, the player input received at the gaming device may correspond to an input indicating a desire to place a wager or play a game credit.

The method 1000 may continue by the context sensor 240, 450, or 540 or context sensor instruction set 260 or 630 sensing or collecting current player information from the player profile database 436 (optional step 1008). The context sensor 240, 450, or 540 or context sensor instruction set 260 or 630 must first determine the player 424 with whom the token 104 is currently associated. For virtual tokens 104, this can be done simply by determining the gaming machine 412 or mobile device 428 displaying the token. The gaming machine 412 or mobile device 428 will have the identity of its associated player 424. For physical tokens 104, there are a number of techniques to determine the identity of the associated player 424. For example, the token 104, when given to the player 424, can be assigned the identification of the player 424 or the player's mobile device 428. The token 104 can be associated with the player 424 by determining a spatial location of the token 104 relative to the spatial location of the player 424. For example, the token 104 can be spatially located relative to a gaming machine 412 being played by the player 424 or a dedicated token or wagering area associated with the player's seating position. Based on the associated player identity, the context sensor 240, 450, or 540 or context sensor instruction set 260 or 630 can request, or cause the request of, and receive associated current player profile information from the player profile database 436.

The method 1000 may continue by the context sensor 240, 450, or 540 or context sensor instruction set 260 or 630 sensing or collecting current event information from the player profile database 432 (optional step 1012). The context sensor 240, 450, or 540 or context sensor instruction set 260 or 630 sensing must first determine the game or gaming session or gaming device with which the token 104 is currently associated. For virtual tokens 104, this can be done simply by determining the gaming machine 412 or mobile device 428 displaying the token. For physical tokens 104, there are a number of techniques to determine the game or gaming session or gaming device with which the token 104 is currently associated. For example, the token 104 can be associated with the game or gaming device by determining a spatial location of the token 104 relative to the spatial location of the gaming machines 412 and mobile devices 428 in the gaming system 400. The gaming machine 412 or mobile device 428 closest to the token 104 is deemed to be associated with the token 104. This can be done by comparing a current spatial location of the token 104 with the various current spatial locations of the gaming machines 412 and mobile devices 428. Alternatively or additionally, the token and gaming machine or mobile device can pair with one another by exchanging pairing signals. The strongest signal is that selected by either the token 104 or gaming machine 412 or mobile device 428 for pairing. Based on the associated gaming device, the context sensor 240, 450, or 540 or context sensor instruction set 260 or 630 can request, or cause the request of, and receive associated current event information from the event database 432.

The method 1000 may continue by the context sensor 240, 450, or 540 or context sensor instruction set 260 or 630 sensing or collecting a current spatial position of the token 104 (optional step 1016). This current spatial position of the virtual token is typically determined relative to a two or three-dimensional reference grid or matrix of a display. The current spatial position of the physical token 104 can be determined by any of the techniques noted above.

The method 1000 may continue by the context sensor 240, 450, or 540 or context sensor instruction set 260 or 630 sensing a current token displacement of the token 104 from a first spatial location to a second spatial location (optional step 1020). The spatial displacement of a virtual token can be determined by detecting a drag source (from which the dragged token originates) and/or drop target (which receives the dropped token 104) in a drag-and-drop operation. The spatial displacement of a physical token can be determined by any of the context sensors noted above.

The method 1000 may continue by the context sensor 240, 450, or 540 or context sensor instruction set 260 or 630 sensing a current ambient condition relative to the token 104 (optional step 1024). The ambient condition can be, for example, ambient sound, light, image(s), and movement of objects in spatial proximity to the gaming venue token. For virtual tokens, this can be done by analyzing the image information displayed in spatial proximity to the displayed token. For physical tokens, this can be done by any of the ambient context sensors noted above.

The method 1000 may continue by the context sensor 240, 450, or 540 or context sensor instruction set 260 or 630 sensing a current power level of the token 104 (optional step 1028). For a virtual token, this is normally not used as context information. When the virtual token is displayed by a portable gaming device, the current power level of the gaming device can be used as the current power level of the token 104. For physical tokens and portable gaming devices, the current power level may be determined by the techniques noted above, such as by a Coulomb counter.

The method 1000 may continue by the context sensor 240, 450, or 540 or context sensor instruction set 260 or 630 determining, in decision diamond 1032, whether there has been a change in sensed context information. When there is no change, the context sensor 240, 450, or 540 or context sensor instruction set 260 or 630 returns to step 1004 and no change is typically made to the selected sensory feedback response of the token. When there is a change, the context sensor 240, 450, or 540 or context sensor instruction set 260 or 630 applies the gaming token instructions 628.

Figure 11:
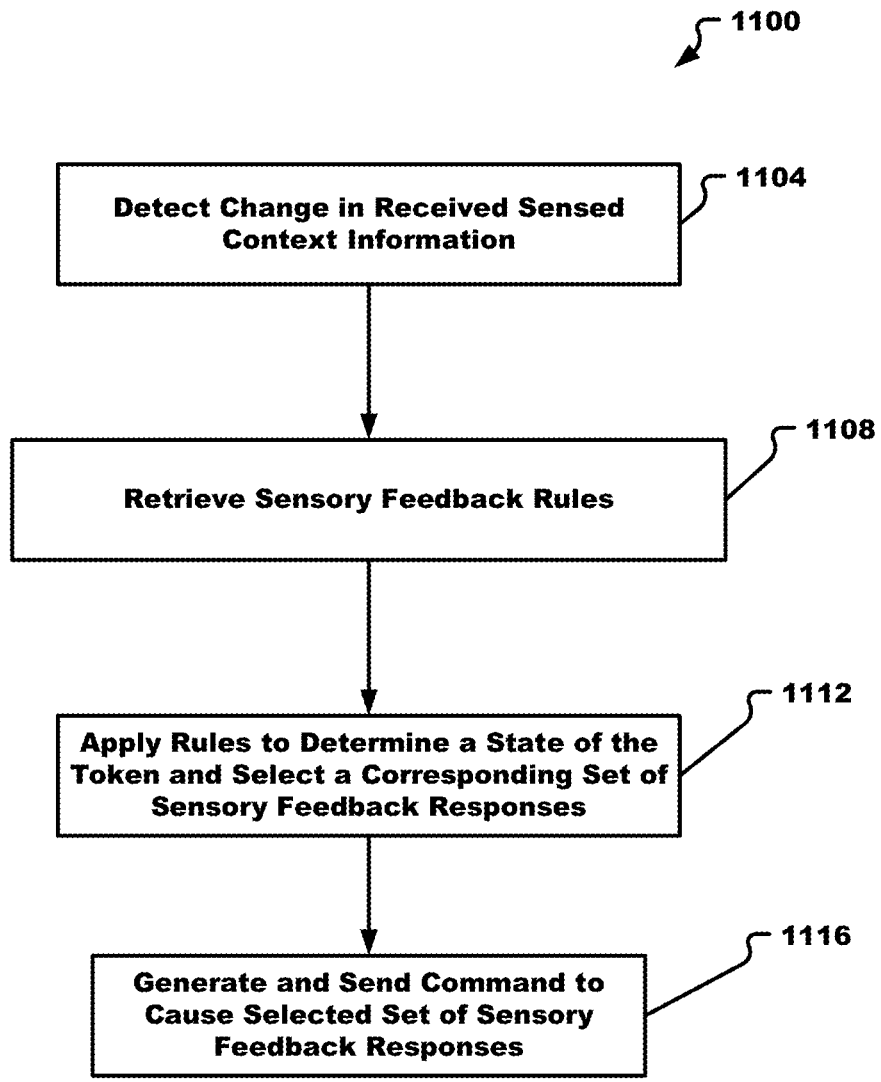
FIG. 11 is a flow chart illustrating gaming venue token logic in accordance with embodiments of the present disclosure.

With reference to FIG. 11, various gaming token instruction operations of a gaming venue token 104, gaming machine 412, gaming server 416, and/or mobile device 428 will be described in accordance with at least some embodiments of the present disclosure.

The method 1100 begins when the gaming token instructions 628 detects a change in received sensed context information (step 1104).

In response, the method 1100 continues by the processor 248 or 604 retrieving sensory feedback response rules to select a sensory feedback response for the token 104 (step 1108).

The method 1100 continues by the processor 248 or 604 applying the rules against the change in received sensed context information to determine a next state of the token. The state of the token corresponds or maps to a set of one or more sensory feedback responses (step 1112).

The method 1100 continues by the processor 248 or 604 generating and sending a command to cause the selected set of sensory feedback responses in the token 104.

The methods 1000 and 1100 will be illustrated with a number of examples.

In a first example, the processor 248 of a physical token 104 determines that the token is within a predetermined distance of or within a selected area. In response, the processor 248 selects a set of sensory feedback responses, such as emitting selected sounds through the speaker 304, vibrating as shown in FIG. 3A, and/or lighting up the illuminated circumferential band 112 in one or more colors. By way of further illustration, the context sensor can comprise a wireless location device and, in a first sensed context, the context sensor senses that the gaming token is within a predetermined distance of a first portion of a gaming surface, and, in a second sensed context, the context sensor senses that the gaming token is within the predetermined distance of a different second portion of the gaming surface. The first sensory feedback response comprises a first color of a portion of the gaming token, and the second sensory feedback response comprises a different second color of the portion of the gaming token. As will be appreciated, the gaming server 416 can alternatively or additionally assign other sensory feedback responses to the token 104.

In a further example, the display 108 area of a virtual or physical token 104 displays promotions before and during game rounds, e.g. double wage ×2, free meal if you win the round, etc.

In yet a further example, a virtual or physical token 104 selects sensory feedback responses that create a player impression that the token has an intelligent personality of its own as if it were the player's pet or intelligent assistant. By way of illustration, the selected sensory feedback response of the token can be sad when the player loses (such as by displaying darker colors or a sad face on the display), can celebrate a win by the player (such as by displaying bright colors or a happy face on the display or emitting cheering voices via the speaker), can anticipate an intense moment in a game (such as by pulsating lights, displaying a tense face, or playing music indicating suspense), and can encourage a player to go towards an area to play a game or do an activity (such as by displaying in the display 108 a compass with north arrow pointing towards the area).

By way of further illustration, the context sensor can monitor a status of a player of the game; in a first sensed context, the context sensor senses that the player has a first status; in a second sensed context, the context sensor senses that the player has a different second status; the first sensory feedback response comprises a first intensity of light emitted by the gaming token, and the second sensory feedback response comprises a different second intensity of light emitted by the gaming token. As will be appreciated, the gaming server 416 can alternatively or additionally assign other sensory feedback responses to the token 104.

In yet a further example, a player 424 wants to play roulette and buys in at $100. The dealer or gaming server 416 registers player identifiable (physical or virtual) tokens 104 as a certain color or symbol and issues them to the player 424. The player 424 places the tokens in various positions on the roulette table. Some of the player's tokens 104 are in a winning position at the end of the game. Those tokens in the winning position exhibit a set of sensory feedback responses associated with a win, such as the light source of the physical token 104 or the virtual token 104 itself starts to pulsate in color, the display 108 of the physical or virtual token shows an animation, and the speaker 304 for the physical token or the sound system of the VR or AR display plays a "Yay" sound to add to the excitement of the table. The multiple tokens in the winning position can provide substantially synchronized sensory feedback responses. A different set of sensory feedback responses are provided by the tokens 104 in a losing position. As will be appreciated, the gaming server 416 can alternatively or additionally assign other sensory feedback responses to the token 104.

By way of illustration, the context sensor can monitor a state of the game; in a first sensed context, the context sensor senses that the game is in a first state; in a second sensed context, the context sensor senses that the game is in a second, different state; the first sensory feedback response comprises a first rate of vibration of the gaming token; and the second sensory feedback response comprises a different second rate of vibration of the gaming token.

In yet a further example, the same virtual or physical gaming venue token is customized to have a different appearance for different types of games. For example, a gaming venue token can display first content for a first type of game and different second content for a different second type of game.

In yet a further example, the same virtual or physical gaming venue token is customized to have a different appearance for different corresponding values. For example, a gaming venue token can display first content when it has a first assigned value and different second content when it has a different second assigned value.

In yet a further example, a gaming venue token has different appearances when viewed by a player with or without VR or AR eyewear. In other words, the display 108 can display different content depending on whether the player views the token with or without VR or AR eyewear.

In yet a further example, the dealer or gaming server 416 of the gaming table 500 (FIG. 5) assigns a physical or virtual token color to the player 424. By way of illustration, the player 424 buys tokens and sits in position 4 of the table. The gaming server 416 assigns the color "blue" to position 4 so the gaming server 416 sends a wireless command to the transmitter at position 4 to instruct the physical tokens to emit blue light and have a blue display 108 or have a default color of blue light. For virtual tokens, the gaming server 416 causes the display of the gaming machine 412 at position 4 to display blue for the band 112 and display 108. As will be appreciated, the gaming server 416 can alternatively or additionally assign other sensory feedback responses to the token 104.

In yet a further example, the player 424 is allowed to choose the selectable color of the virtual or physical tokens 104. This might be done with a mobile device 428, such as a mobile phone, smart watch or Augmented Reality (AR) device. The player 424 chooses the color or color pattern for the band 112 and display 108 via the mobile device 428, which then wirelessly informs the gaming server 416 or gaming machine 412 of the table 500 about the selection. As will be appreciated, the player, by the mobile device 428, can alternatively or additionally assign other sensory feedback responses to the token 104.

In another example, a poker tournament is taking place and the players initiate an "All In" by pushing their tokens 104 into the center of the pot. During the round, the bands 112 and displays 108 of the tokens 104 pulsate and change intensity or color during the anticipation of the round. If the tokens have speakers 304, they can emit selected sounds or words and phrases that root for their corresponding player as if the token were an intelligent personality having a life of its own (independent of the respective player). When player wins, the tokens corresponding to a different (losing) player can celebrate and change their sensory feedback responses to those associated with the new owners (or winning player) when the game is completed. As will be appreciated, the gaming server 416 can alternatively or additionally assign other sensory feedback responses to the token 104.

In another example, Janet is walking around the casino and notices that the display 108 of one of her tokens is showing a compass display, leading her to a gaming machine 412 on the floor that is due to hit a mystery bonus. When she is in spatial proximity to the gaming machine 412, the speaker 304 of the token 104 emits a voice saying "yeah yeah, that's it" to let Janet know that she is at the right gaming machine 412. As will be appreciated, the gaming server 416 can alternatively or additionally assign other sensory feedback responses to the token 104.

In another example, Harry is playing blackjack with friends. Each player has a corresponding position at the gaming table 500 and the tokens 104 associated with each player position have a different sensory feedback response e.g., the tokens at each seating position illuminate and/or display a different color. Harry decides to double down, in response his tokens start pulsating in color, and he loses. One of Harry's friends slides some tokens over to his corresponding player position for him to use, and the tokens recognize that they are at the new player position and start to illuminate and display the color associated with that position. As will be appreciated, the gaming server 416 can alternatively or additionally assign other sensory feedback responses to the token 104.

The sensory feedback responses (e.g., animations, displays or sounds) of the tokens 104 could scale to the event or game outcome. For example, a small win might cause the light source and display of the tokens to flash a selected color for a first time duration or a first frequency while a large win might cause the light source and display of the tokens to flash the selected color for a (longer) second time duration or a (higher) second frequency. Alternatively, a large win might cause the token display or cycle colors in patterns. Scaling can also be done by animating only a subset (but not all) of the currently wagered tokens. By way of illustration, there are fifteen (15) tokens in the pot (or the center of the game table in poker). A player wins the pot which is considered a small win (relative to other pots in other games or pots in games historically) so the gaming system 400 picks 5 of the 15 tokens and instructs them to provide a selected set of sensory feedback responses while not instructing the other tokens to provide the selected set of sensory feedback responses (though the tokens might provide a different set of sensory feedback responses). As will be appreciated, the gaming server 416 can alternatively or additionally assign other sensory feedback responses to the token 104.

In another example, tokens 104 are located in close spatial proximity to one another (for instance, in the center of a poker table). The context sensor of each token detects the other nearby tokens and uses audio emitted by the speakers of the nearby tokens to "banter" with one another based on the information associated with each token. By way of illustration, if there are 5 yellow tokens, 6 blue tokens, and 1 red token in the pot, the yellow token could detect that yellow is the only token in spatial proximity and say, "You're looking lonely over there, Red."

By way of further illustration, in a first sensed context, the context sensor senses that the gaming token is within a predetermined distance of another gaming token, and, in the second sensed context, the context sensor senses that the gaming token is not within the predetermined distance of the another gaming token. A first sensory feedback response used in the first sensed context comprises a first audible sound emitted by the gaming token, the first audible sound having a first sound spectrum, and a second sensory feedback response used in a second sensed context comprises a second audible sound emitted by the gaming token. The second audible sound has a second sound spectrum, and the first and second sound spectra are different from each other. As will be appreciated, the gaming server 416 can alternatively or additionally assign other sensory feedback responses to the token 104.

In another example, each member of a set of members (e.g., Players Club members) are given one or more tokens to play in a special tournament or other event at a specific date and time. As the time for the tournament approaches, each member's tokens begin to provide sensory feedback responses (e.g., light up, vibrate and play an audio reminder message). As the time for the tournament draws closer, the intensity of the set of sensory feedback responses or a different set of sensory feedback responses is provided by the tokens (for instance, the display of the token can display information about the date of the tournament and where the tournament is located). If transmitters were located throughout the casinos, the messages or directions to the event could change depending on where the player is located in the casino.

The disclosure also covers methods to preserve the battery charge level of the power source 220 of the tokens 104 so that the tokens keep working over a longer period of time. Referring to FIG. 9, the gaming machine 412 (shown as a table) has one or more marked player locations 916*a-h* that can double as charging areas positioned around the table where tokens are likely to be placed. As the tokens are placed on the table in various areas, they are charged.

In another example, the tokens provide a selected set of sensory feedback responses (e.g., display or animate) when moved or displaced and then (after a selected time has expired since token movement) stop the selected set of sensory feedback responses or provide a different set of sensory feedback responses (e.g., turn off after a short period of time). By way of illustration, a token might be off and not using battery power from the power source 220. When the player moves the token display 108 of the token 104, for instance, displays "$25" for 4 seconds and then turns off again.

By way of further illustration, the context sensor can comprise a motion sensor and, in a first sensed context, the context sensor senses that the gaming token is moving at a first movement rate; in a second sensed context, the context sensor senses that the gaming token is moving at a different second movement rate; in a first state corresponding to the first sensed context, a visual display displays a first video; and, in a second state corresponding to the second sensed context, the visual display displays a second video. The first and second videos are different from each other. As will be appreciated, the gaming server 416 can alternatively or additionally assign other sensory feedback responses to the token 104.

In another example, the gaming system 400 selects tokens 104 to provide a set of sensory feedback responses (e.g., participate in an animation) and the gaming system 400 chooses the tokens with charge levels above a selected level to participate, allowing the other tokens to gain or maintain charge by not being used.

In another example, the token 104 signals the gaming system 400 that the token 104 needs to be replaced or charged. The token 104 can notify the system about its location so that an attendant can replace or charge it.

In another example, tokens 104 that are stacked can recognize that the top and/or bottom of the token is obscured (or senses a low ambient light level) and automatically power down the display 108 or other light sources. By way of illustration, referring to FIG. 1 the token at the top of the stack can have its upper display 108 activated and its lower display 108 deactivated due to the lower display being blocked by the token below.

In another example, a token 104 with a higher remaining charge in its power source 220 shares a portion of that charge with one or more nearby tokens.

The casino might implement measures to keep people from removing the tokens 104 from the casino. For example, beacons (not shown) could be placed around the casino to detect the tokens being removed. Alternatively or additionally, a set of sensory feedback responses could be provided by the token 104 when it senses that it is approaching a boundary of the casino or leaving an area of the casino.

In various embodiments in which the gaming system includes a plurality of gaming machines 412, the gaming machines are configured to communicate with one another to provide a group gaming environment. In certain such embodiments, the gaming machines enable players of those gaming machines to work in conjunction with one another, such as by enabling the players to play together as a team or group, to win one or more awards. In other such embodiments, the gaming machines enable players of those gaming machines to compete against one another for one or more awards. In one such embodiment, the gaming machines enable the players of those gaming machines to participate in one or more gaming tournaments for one or more awards.

In various embodiments, the gaming system or gaming device includes one or more player tracking systems. Such player tracking systems enable operators of the gaming system or gaming device (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming device to begin a game, the card reader reads the player identification number off the player tracking card to identify the player. The gaming device timely tracks any suitable information or data relating to the identified player's game and updates the player profile or game event information in the player profile or event databases 436 or 432, respectively. The gaming device also timely tracks when the player tracking card is removed to conclude play for that game. In another embodiment, rather than requiring insertion of a player tracking card into the card reader, the gaming device utilizes one or more portable devices, such as a mobile phone, a radio frequency identification tag, or any other suitable wireless device, to track when a game begins and ends. In another embodiment, the gaming device utilizes any suitable biometric technology or ticket technology to track when a game begins and ends.

In such embodiments, during one or more games, the gaming device tracks, as event information, any suitable information or data, such as any amounts wagered, average wager amounts, and/or the time at which these wagers are placed. In different embodiments, for one or more players, the player tracking system and player profile includes the player's account number, the player's card number, the player's first name, the player's surname, the player's preferred name, the player's player tracking ranking, any promotion status associated with the player's player tracking card, the player's address, the player's birthday, the player's anniversary, the player's recent games, or any other suitable data.

Certain of the gaming systems described herein, including gaming devices located in a casino or another gaming establishment, include certain components and/or are configured to operate in certain manners that differentiate these gaming devices and systems from general purpose computing devices (i.e., certain personal gaming devices such as desktop computers and laptop computers).

For instance, gaming devices are highly regulated to ensure fairness and, in many cases, gaming devices, such as gaming machines 112, are configured to award monetary awards up to multiple millions of dollars. To satisfy security and regulatory requirements in a gaming environment, hardware and/or software architectures are implemented in EGMs that differ significantly from those of general-purpose computing devices. For purposes of illustration, a description of gaming devices relative to general-purpose computing devices and some examples of these additional (or different) hardware and/or software architectures found in gaming devices are described herein.

At first glance, one might think that adapting general-purpose computing device technologies to the gaming industry and gaming devices would be a simple proposition because both general purpose computing devices and gaming devices employ processors that control a variety of devices. However, due to at least: (1) the regulatory requirements placed on gaming devices, (2) the harsh environment in which gaming devices operate, (3) security requirements, and (4) fault tolerance requirements, adapting general purpose computing device technologies to gaming devices can be quite difficult. Further, techniques and methods for solving a problem in the general-purpose computing device industry, such as device compatibility and connectivity issues, might not be adequate in the gaming industry. For instance, a fault or a weakness tolerated in a general-purpose computing device, such as security holes in software or frequent crashes, is not tolerated in a gaming device because in a gaming device these faults can lead to a direct loss of funds from the gaming device, such as stolen cash or loss of revenue when the gaming device is not operating properly or when the random outcome determination is manipulated.

Certain differences between general-purpose computing devices and gaming devices are described below. A first difference between gaming devices and general-purpose computing devices is that gaming devices are state-based systems. A state-based system stores and maintains its current state in a non-volatile memory such that, in the event of a power failure or other malfunction, the state-based system can return to that state when the power is restored or the malfunction is remedied. For instance, for a state-based gaming device, if the gaming device displays an award for a game of chance but the power to the gaming device fails before the gaming device provides the award to the player, the gaming device stores the pre-power failure state in a non-volatile memory, returns to that state upon restoration of power, and provides the award to the player. This requirement affects the software and hardware design on gaming devices. General-purpose computing devices are typically not state-based machines, and a majority of data can be lost when a malfunction occurs on a general-purpose computing device.

A second difference between gaming devices and general-purpose computing devices is that, for regulatory purposes, the software on the gaming device utilized to operate the gaming device has been designed to be static and monolithic to prevent cheating by the operator of the gaming device. For instance, one solution that has been employed in the gaming industry to prevent cheating and to satisfy regulatory requirements has been to manufacture a gaming device that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the gaming device in the presence of a gaming regulator. Regardless of whether the EPROM solution is used, to gain approval in most gaming jurisdictions, a gaming device must demonstrate sufficient safeguards that prevent an operator or a player of a gaming device from manipulating the gaming device's hardware and software in a manner that gives him an unfair, and in some cases illegal, advantage.

A third difference between gaming devices and general-purpose computing devices is authentication-gaming devices storing code are configured to authenticate the code to determine if the code is unaltered before executing the code. If the code has been altered, the gaming device prevents the code from being executed. The code authentication requirements in the gaming industry affect both hardware and software designs on gaming devices. Certain gaming devices use hash functions to authenticate code. For instance, one gaming device stores game program code, a hash function, and an authentication hash (which may be encrypted). Before executing the game program code, the gaming device hashes the game program code using the hash function to obtain a result hash and compares the result hash to the authentication hash. If the result hash matches the authentication hash, the gaming device determines that the game program code is valid and executes the game program code. If the result hash does not match the authentication hash, the gaming device determines that the game program code has been altered (i.e., may have been tampered with) and prevents execution of the game program code.

A fourth difference between gaming devices and general-purpose computing devices is that gaming devices have unique peripheral device requirements that differ from those of a general-purpose computing device, such as peripheral device security requirements not usually addressed by general-purpose computing devices. For instance, monetary devices, such as coin dispensers, bill validators, and ticket printers and computing devices that are used to govern the input and output of cash or other items having monetary value (such as tickets) to and from a gaming device have security requirements that are not typically addressed in general purpose computing devices. Therefore, many genera-purpose computing device techniques and methods developed to facilitate device connectivity and device compatibility do not address the emphasis placed on security in the gaming industry.

To address some of the issues described above, a number of hardware/software components and architectures are utilized in EGMs and EGTs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain gaming devices use a watchdog timer to provide a software failure detection mechanism. In a normally-operating gaming device, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain gaming devices use several power supply voltages to operate portions of the computer circuitry. These can be generated in a central power supply or locally on the computer board. If any of these voltages falls out of the tolerance limits of the circuitry they power, unpredictable operation of the gaming device may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain gaming devices have power supplies with relatively tighter voltage margins than that required by the operating circuitry. In addition, the voltage monitoring circuitry implemented in certain gaming devices typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the gaming device.

As described above, certain gaming devices are state-based machines. Different functions of the game provided by the gaming device (e.g., bet, play, result, points in the graphical presentation, etc.) may be defined as a state. When the gaming device moves a game from one state to another, the gaming device stores critical data regarding the game software in a custom non-volatile memory subsystem. This ensures that the player's wager and credits are preserved and to minimize potential disputes in the event of a malfunction on the gaming device. In general, the gaming device does not advance from a first state to a second state until critical information that enables the first state to be reconstructed has been stored. This feature enables the gaming device to recover operation to the current state of play in the event of a malfunction, loss of power, etc. that occurred just prior to the malfunction. In at least one embodiment, the gaming device is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the gaming device memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve gaming device critical data, although other types of non-volatile memory devices may be employed. These memory devices are typically not used in typical general purpose computing devices.

Thus, in at least one embodiment, the gaming device is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of gaming device critical information) within a time period of 200 milliseconds or less. In at least one embodiment, the time period of 200 milliseconds represents a maximum amount of time for which sufficient power may be available to the various gaming device components after a power outage event has occurred at the gaming device.

As described previously, the gaming device may not advance from a first state to a second state until critical information that enables the first state to be reconstructed has been atomically stored. After the state of the gaming device is restored during the play of a game of chance, game play may resume and the game may be completed in a manner that is no different than if the malfunction had not occurred. Thus, for example, when a malfunction occurs during a game of chance, the gaming device may be restored to a state in the game of chance just prior to when the malfunction occurred. The restored state may include metering information and graphical information that was displayed on the gaming device in the state prior to the malfunction. For example, when the malfunction occurs during the play of a card game after the cards have been dealt, the gaming device may be restored with the cards that were previously displayed as part of the card game. As another example, a bonus game may be triggered during the play of a game of chance in which a player is required to make a number of selections on a video display screen. When a malfunction has occurred after the player has made one or more selections, the gaming device may be restored to a state that shows the graphical presentation just prior to the malfunction including an indication of selections that have already been made by the player. In general, the gaming device may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device, such as the player profile database 436 or event database 432. The information stored in the non-volatile memory may be detailed enough to reconstruct a portion of the graphical presentation that was previously presented on the gaming device and the state of the gaming device (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming device prior to, during, and/or after the disputed game to demonstrate whether the player was correct or not in her assertion.

Another feature of gaming devices is that they often include unique interfaces, including serial interfaces, to connect to specific subsystems internal and external to the gaming device. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the gaming device, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from an gaming device to a remote device. Often SAS is used in conjunction with a player tracking system.

Certain gaming devices may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an gaming device by monitoring security switches attached to access doors in the gaming device cabinet. Access violations result in suspension of game play and can trigger additional security operations to preserve the current state of game play. These circuits also function when power is off by use of a battery backup. In power-off operation, these circuits continue to monitor the access doors of the gaming device. When power is restored, the gaming device can determine whether any security violations occurred while power was off, e.g., via software for reading status registers. This can trigger event log entries and further data authentication operations by the gaming device software.

Trusted memory devices and/or trusted memory sources are included in an gaming device to ensure the authenticity of the software that may be stored on less secure memory subsystems, such as mass storage devices. Trusted memory devices and controlling circuitry are typically designed to not enable modification of the code and data stored in the memory device while the memory device is installed in the gaming device. The code and data stored in these devices may include authentication algorithms, random number generators, authentication keys, operating system kernels, etc. The purpose of these trusted memory devices is to provide gaming regulatory authorities a root trusted authority within the computing environment of the gaming device that can be tracked and verified as original. This may be accomplished via removal of the trusted memory device from the gaming device computer and verification of the secure memory device contents is a separate third party verification device. Once the trusted memory device is verified as authentic, and based on the approval of the verification algorithms included in the trusted device, the gaming device is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs and EGTs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, gaming devices that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should further be appreciated that the gaming device of the present disclosure may have varying or alternative housing configurations.

It should further be appreciated that the gaming device of the present disclosure may have varying or alternative display device configurations.

In various embodiments, the gaming device of the present disclosure is configured to be positioned on a base or stand.

It should be appreciated that the enhanced physical player interaction provided by the present disclosure, in addition to being implemented in an gaming device configured to be located on a casino floor, can be implemented in one or more personal gaming devices, such as desktop computers, laptop computers, tablet computers or computing devices, personal digital assistants, mobile phones, and other mobile computing devices.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

As will be appreciated by one skilled in the art, aspects of the present disclosure may be illustrated and described herein in any of a number of patentable classes or circumstances including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the disclosure of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

What is claimed is:

1. A gaming system, comprising:
a gaming token representing a wager amount placed in a game, the gaming token comprising a sensory feedback source to produce a selected sensory feedback response to a player and a power source;
a context sensor to sense a context associated with the gaming token;
a gaming table surface comprising a charge pad, the gaming table surface receiving, during and as part of the game, wagered gaming tokens currently assigned to an identity of a player, the charge pad comprising a wireless charging coil to emit electromagnetic signals to charge inductively the power source of the gaming token during the game; and
a processor causing the gaming token to have a first state in response to a first sensed context and a second state in response to a second sensed context, wherein the sensory feedback source provides, in the first state, a first sensory feedback response and, in the second state, a different second sensory feedback response.

2. The gaming system of claim 1, wherein the charge pad comprises a communication interface to transmit wirelessly data signals to the gaming token while the gaming token is charged inductively, the data signals comprising sensed context and the wireless charging coil and communication interface being positioned at a common location on or in spatial proximity to the gaming table surface, wherein the charge and data pad is located in spatial proximity to a player station at the gaming table, wherein the gaming token comprises a casino chip, wherein the context sensor comprises a wireless location device, wherein, in the first sensed context, the context sensor senses that the gaming token is within a predetermined distance of a first portion of a gaming surface, wherein, in the second sensed context, the context sensor senses that the gaming token is within the predetermined distance of a different second portion of the gaming surface, wherein the first sensory feedback response comprises a first color of at least a portion of the gaming token, and wherein the second sensory feedback response comprises a different second color of the at least a portion of the gaming token.

3. The gaming system of claim 1, wherein the charge pad is located near a marked player location that receives one or more game pieces different from the gaming token, wherein the gaming token comprises the context sensor, wherein the context sensor comprises a wireless location device, wherein, in the first sensed context, the context sensor senses that the gaming token is within a predetermined distance of another gaming token, wherein, in the second sensed context, the context sensor senses that the gaming token is not within the predetermined distance of the another gaming token, wherein the first sensory feedback response comprises a first audible sound emitted by the gaming token, the first audible sound having a first sound spectrum, wherein the second sensory feedback response comprises a second audible sound emitted by the gaming token, the second audible sound having a second sound spectrum, and wherein the first and second sound spectra are different from each other.

4. The gaming system of claim 1, wherein the context sensor comprises a motion sensor, wherein, in the first sensed context, the context sensor senses that the gaming token is moving at a first movement rate, wherein, in the second sensed context, the context sensor senses that the gaming token is moving at a different second movement rate, wherein, in the first state, a visual display displays a first video, and wherein, in the second state, the visual display displays a second video, the first and second videos being different from each other, wherein the processor causes the gaming token to have a third state in response to a third sensed context and a fourth state in response to a fourth sensed context, wherein the third and fourth sensed contexts correspond to at least one of a current power level, state of charge, and depth of charge of the power source, and wherein the third and fourth states correspond to different magnitudes of the at least one of a current power level, state of charge, and depth of charge of the power source.

5. The gaming system of claim 1, wherein the gaming token comprises a casino chip, wherein the context sensor monitors a state of the game, wherein, in the first sensed context, the context sensor senses that the game is in a first state, wherein, in the second sensed context, the context sensor senses that the game is in a second, different state, wherein the first sensory feedback response comprises a first rate of vibration of at least a portion of the gaming token, and wherein the second sensory feedback response comprises a different second rate of vibration of the at least a portion of the gaming token and wherein the charge pad is located near a marked player location that receives one or more game pieces different from the gaming token.

6. The gaming system of claim 1, wherein the charge and data pad is located near a marked player location that receives one or more game pieces different from the gaming token, wherein the context sensor monitors a status of a player of the game, wherein, in the first sensed context, the context sensor senses that the player has a first status, wherein, in the second sensed context, the context sensor senses that the player has a different second status, wherein the first sensory feedback response comprises a first intensity of light emitted by the gaming token, and wherein the second sensory feedback response comprises a different second intensity of light emitted by the gaming token.

7. A method of facilitating player interaction in a game, comprising:

receiving, by a processor of the gaming system from a context sensor in a gaming token representing a wager amount placed in a game, input that a sensed context is associated with the gaming token, the sensed context comprising a sensed parameter associated with the gaming token;

comparing, by the processor of the gaming system, the sensed context against a plurality of contexts, each of a plurality of different possible sensory feedback responses corresponding to a different one of the plurality of contexts;

based on the comparing, selecting, by the processor of the gaming system, from among the plurality of different possible sensory feedback responses, a selected sensory feedback response corresponding to the sensed context;

causing, by the processor of the gaming system, the gaming token to produce the processor selected sensory feedback response to a player; and during the game, inductively charging, by a wireless charging coil in a chip wagering area on a gaming table surface, a power source of the gaming token while the gaming token is positioned in the chip wagering area.

8. The method of claim 7, wherein the sensed parameter comprises displacement of the information associated with the gaming token or a surface thereof, wherein the gaming token comprises a token coin, wherein the gaming system comprises an electronic gaming machine, and further comprising:

as the context associated with the gaming token, the processor receiving, from the context sensor, input that the gaming token currently has a first spatial location, wherein the processor selected sensory feedback response comprises a color of at least a portion of the gaming token, and wherein a different sensory feedback response of the plurality of possible sensory feedback responses comprises a different second color of the at least a portion of the gaming token.

9. The method of claim 7, wherein the sensed parameter comprises at least one of ambient light and sound in spatial proximity to the gaming token, wherein the gaming system comprises a video game gambling machine, and further comprising:

as the context associated with the gaming token, the processor receiving, from the context sensor, input that the gaming token is within a predetermined distance of another gaming token, wherein the processor selected sensory feedback response comprises an audible sound emitted by the gaming token, the audible sound having a first sound spectrum, and wherein a different sensory feedback response of the plurality of possible sensory feedback responses comprises a different audible sound emitted by the gaming token, the different audible sound having a sound spectrum different from the sound spectrum of the processor selected sensory feedback response.

10. The method of claim 7, wherein the context sensor comprises a motion sensor, wherein the gaming token comprises a visual display, wherein the visual display comprises electronic ink, and further comprising:
- as the context associated with the gaming token, the processor receiving, from the context sensor, input that the gaming token is moving at at least a first movement rate, wherein the processor selected sensory feedback response comprises the visual display displaying a first symbol and wherein a different sensory feedback response of the plurality of possible sensory feedback responses comprises the visual display displaying a different second symbol.

11. The method of claim 7, wherein the sensed parameter comprises at least one of a current power level, state-of-charge, and depth-of-charge of a power source of the gaming token, wherein the gaming token comprises a casino chip, wherein the gaming system comprises a virtual gaming machine, wherein the chip wagering area comprises a communication interface to transmit wirelessly data signals to the gaming token while the gaming token is charged inductively, the data signals comprising sensed context and the wireless charging coil and communication interface being positioned at a common location on or in spatial proximity to the gaming table surface, and further comprising:
- as a second context associated with the gaming token, the processor receiving, from the gaming system, input that the game has a first status, wherein the processor selected sensory feedback response comprises a first rate of vibration of at least a portion of the gaming token and wherein a different sensory feedback response of the plurality of possible sensory feedback responses comprises a different second rate of vibration of the at least a portion of the gaming token.

12. The method of claim 7, wherein the gaming token comprises a substantially cylindrical body, wherein the sensed parameter comprises at least one of a current power level, state-of-charge, and depth-of-charge of a power source of the gaming token, wherein the gaming system comprises an augmented reality gaming machine, wherein the chip wagering area comprises a communication interface to transmit wirelessly data signals to the gaming token while the gaming token is charged inductively, the data signals comprising sensed context and the wireless charging coil and communication interface being positioned at a common location on or in spatial proximity to the gaming table surface, and further comprising:
- as a second context associated with the gaming token, the processor receiving, from the gaming system, input that a player of the game has a first status, wherein the processor selected sensory feedback response comprises a first intensity of light emitted by the gaming token and wherein a different sensory feedback response of the plurality of possible sensory feedback responses comprises a different second intensity of light emitted by the gaming token.

13. The method of claim 7, wherein the chip wagering area comprises a communication interface to transmit wirelessly data signals to the gaming token while the gaming token is charged inductively, the data signals comprising sensed context and the wireless charging coil and communication interface being positioned at a common location on or in spatial proximity to the gaming table surface, wherein the context sensor comprises at least one of a gyro sensor, accelerometer, and magnetometer and further comprising:
- as the context associated with the gaming token, the processor receiving, from the gaming system, input that the game is a first type of game; and
- in response, causing, by the processor, a plurality of gaming tokens used in the game to emit simultaneously a common processor selected sensory feedback response.

14. The method of claim 7, wherein the gaming token comprises a power source, wherein the sensed parameter comprises at least one of a current power level, state-of-charge, and depth-of-charge of a power source of the gaming token, and further comprising:
- as the context associated with the gaming token, the processor receiving, from the context sensor, input that the gaming token is in spatial proximity to a different second gaming token;
- in response, causing, by the processor, the gaming token and second gaming token to provide simultaneously different processor selected sensory feedback responses;
- receiving, from the context sensor, input that the gaming token has a second context, the second context being that the gaming token is within a predetermined distance of a predetermined charging portion of a gaming surface; and
- in response to receiving input that the gaming token has a second context, causing, by the processor, the gaming token to provide a second selected sensory feedback response wherein the second selected sensory feedback response is associated with charging the power source of the gaming token and is different from the different selected sensory feedback responses.

15. A gaming token used to represent a wager amount in a game, comprising:
- a processor;
- an antenna to receive wireless signals from and transmit wireless signals to a gaming system;
- a demodulator to demodulate a received wireless signal;
- a decoder to decode the demodulated signal and determine data in the demodulated signal;
- an encoder to encode data to be emitted by the antenna to the gaming system;
- a modulator to modulate the encoded data for transmission as a wireless signal by the antenna to the gaming system;
- an onboard power source;
- a wireless charging coil to receive electromagnetic signals;
- a sensory feedback source to produce a selected sensory feedback response to a player, the sensory feedback source being coupled with the processor; and
- a computer-readable storage medium, coupled with the processor, comprising instructions that are executable by the processor, wherein the instructions comprise:
  - a set of instructions that receives, as part of the data in the received wireless signal, a context associated with the gaming token;
  - a set of instructions that compares the received context against a plurality of contexts, each of a plurality of different possible sensory feedback responses corresponding to a different one of the plurality of contexts and, based on the comparing, selects, from among the plurality of different possible sensory feedback responses, the selected sensory feedback response corresponding to the sensed context; and
  - a set of instructions that cause the sensory feedback source to provide the selected sensory feedback response, wherein the gaming token is positioned on a gaming table surface of a gaming machine, the gaming table surface comprising a charge pad, the charge pad being located in a chip wagering zone and comprising a second wireless charging coil to emit electromagnetic signals that are received by the wireless charging coil of the gaming token to charge inductively the onboard power source.

16. The gaming token of claim 15, wherein the gaming token comprises a casino chip, wherein the sensory feedback source comprises a light, wherein the processor is part of an integrated circuit that modulates and demodulates radio-frequency signals, wherein the data in the received wireless signal or a transmitted wireless signal comprises an identifier issued by the gaming system, and wherein the context sensor senses, as the context associated with the gaming token, that the gaming token is within a predetermined distance of a predetermined portion of a gaming surface, wherein the selected sensory feedback response comprises a color of at least a portion of the gaming token, and wherein a different sensory feedback response of the plurality of possible sensory feedback responses comprises a different second color of the at least a portion of the gaming token.

17. The gaming token of claim 15, wherein the gaming token comprises a substantially cylindrical body, wherein the gaming token comprises a rectifier to convert received electromagnetic charging signals into alternating current electrical energy, a voltage regulator that automatically maintains a substantially constant voltage level, and an AC-DC converter to convert the alternating current electrical energy into direct current electrical energy for storage in the onboard power source, wherein the sensory feedback source comprises a speaker, wherein the context sensor senses, as the context associated with the gaming token, that the gaming token is within a predetermined distance of another gaming token, wherein the selected sensory feedback response comprises an audible sound emitted by the gaming token, the audible sound having a first sound spectrum, and wherein a different sensory feedback response of the plurality of possible sensory feedback responses comprises a different audible sound emitted by the gaming token, the different audible sound having a sound spectrum different from the sound spectrum of the selected sensory feedback response.

18. The gaming token of claim 15, wherein the data in the received wireless signal or a transmitted wireless signal comprises pairing information to pair with a gaming device of the gaming system, wherein the sensory feedback source comprises a visual display, and wherein the context sensor senses, as the context associated with the gaming token, that a player is moving the gaming token at at least a first movement rate, wherein the selected sensory feedback response comprises the visual display displaying a first symbol and wherein a different sensory feedback response of the plurality of possible sensory feedback responses comprises a different second symbol displayed by the visual display.

19. The gaming token of claim 15, wherein the data in the received wireless signal or a transmitted wireless signal comprises token location information to enable the gaming system to determine a location of the gaming token relative to a selected point of reference, wherein the data in the received wireless signal comprises command logic from the gaming system only when the location of the gaming token is within a predetermined distance of the selected point of reference, wherein the gaming token comprises a token coin, wherein the sensory feedback source comprises a transducer, wherein the context sensor senses, as the context associated with the gaming token, that the game has a first status, wherein the selected sensory feedback response comprises a first rate of vibration of at least a portion of the gaming token, and wherein a different sensory feedback response of the plurality of possible sensory feedback responses comprises a different second rate of vibration of at least a portion of the gaming token.

20. The gaming token of claim 15, wherein the chip wagering area comprises a communication interface to transmit wirelessly data signals to the gaming token antenna while the gaming token is charged inductively, the data signals comprising sensed context and the second wireless charging coil and communication interface being positioned at a common location on or in spatial proximity to the gaming table surface, wherein the data in a transmitted wireless signal comprises at least one of a current power level, state of charge, and depth of charge of an onboard power source of the gaming token, wherein the gaming token comprises a substantially cylindrical body, wherein the sensory feedback source comprises a light, wherein the context sensor senses, as the context associated with the gaming token, that a command to provide the selected sensory feedback response has been received, wherein the selected sensory feedback response comprises a first intensity of light emitted by the gaming token and wherein a different sensory feedback response of the plurality of possible sensory feedback responses comprises a different second intensity of light emitted by the gaming token.

* * * * *